(12) United States Patent
Erskine et al.

(10) Patent No.: US 11,048,047 B1
(45) Date of Patent: Jun. 29, 2021

(54) HOUSING AN ETALON IN A FREQUENCY REFERENCE SYSTEM

(71) Applicant: Quantum Valley Ideas Laboratories, Waterloo (CA)

(72) Inventors: Jennifer Ann Joe Erskine, Waterloo (CA); Jaime Ramirez-Serrano, Waterloo (CA); James Keaveney, Waterloo (CA); Chang Liu, Waterloo (CA); Hadi Amarloo, Waterloo (CA); Geoffrey Gordon Gillett, Waterloo (CA); James P. Shaffer, Kitchener (CA)

(73) Assignee: Quantum Valley Ideas Laboratories, Waterloo (CA)

( * ) Notice: Subject to any disclaimer, the term of this patent is extended or adjusted under 35 U.S.C. 154(b) by 0 days.

(21) Appl. No.: 17/166,517

(22) Filed: Feb. 3, 2021

(51) Int. Cl.
*G02B 6/26* (2006.01)
*G02B 6/293* (2006.01)
*F21V 8/00* (2006.01)

(52) U.S. Cl.
CPC ....... *G02B 6/29358* (2013.01); *G02B 6/0095* (2013.01); *G02B 6/29395* (2013.01)

(58) Field of Classification Search
CPC ............ G02B 6/29358; G02B 6/29395; G02B 6/0095
See application file for complete search history.

(56) References Cited

U.S. PATENT DOCUMENTS

| | | | |
|---|---|---|---|
| 3,967,211 A | 6/1976 | Itzkan et al. | |
| 4,583,228 A | 4/1986 | Brown et al. | |
| 5,167,444 A | 12/1992 | Hall | |
| 5,422,970 A * | 6/1995 | Miller | G02B 6/241 385/66 |
| 6,426,966 B1 * | 7/2002 | Basting | H01S 3/08004 372/100 |

(Continued)

FOREIGN PATENT DOCUMENTS

WO    2001084201    11/2001

OTHER PUBLICATIONS

"Dunmore Product Data for Item No. DE320, VDA / 100 GA DuPont Kapton HN Polyimide Film", at least as early as Apr. 28, 2017, 1.

(Continued)

*Primary Examiner* — Ellen E Kim
(74) *Attorney, Agent, or Firm* — Henry Patent Law Firm PLLC

(57) ABSTRACT

In a general aspect, a device is disclosed for providing a reference frequency of light. The device includes a housing having a first opening and a second opening. A first optical window covers the first opening and is coupled to the housing by a first ceramic bond that forms a hermetic seal around the first opening. A second optical window covers the second opening and is coupled to the housing by a second ceramic bond that forms a hermetic seal around the second opening. The device also includes an etalon disposed within an evacuated volume enclosed by at least the housing, the first optical window, and the second optical window. The device additionally includes one or more supports suspending the etalon in the evacuated volume. The one or more supports are formed of a material having a thermal conductivity no greater than 5 W/m·K at room temperature.

30 Claims, 10 Drawing Sheets

(56) References Cited

U.S. PATENT DOCUMENTS

| | | | | |
|---|---|---|---|---|
| 2002/0018505 | A1* | 2/2002 | Basting | B23K 26/12 |
| | | | | 372/55 |
| 2003/0231669 | A1* | 12/2003 | Kozlovsky | H01S 5/0233 |
| | | | | 372/36 |
| 2012/0294321 | A1* | 11/2012 | Ma | H01S 5/068 |
| | | | | 372/20 |
| 2017/0373463 | A1* | 12/2017 | Narumi | H01S 3/025 |
| 2019/0267771 | A1* | 8/2019 | Shirakawa | H01S 3/1611 |

OTHER PUBLICATIONS

"Stable Laser Systems", downloaded Apr. 17, 2020, from http://www.stablelasers.com, Apr. 17, 2020, 18 pgs.

Alnis, et al., "Sub-Hz line width diode lasers by stabilization to vibrationally and thermally compensated ULE Fabry-Perot cavities", Phys. Rev. A, 77, 5, Dec. 2008.

Black, "An introducton to Pound-Drever-Hall laser frequency stabilization", American Journal of Physics 69, 79, Apr. 2000, 10 pgs.

Bunch, et al., "Impermeable Atomic Membranes from Graphene Sheets", Nano Letters 8, 8, 2008, 5 pgs.

Ding, et al., "Silver-Based Low-Emissivity Coating Technology for Energy-Saving Window Applications", Modern Technologies for Creating the Thin-film Systems and Coatings; Chapter 20; InTech, 2017, 25 pgs.

Gallego, et al., "High-finesse fiber Fabry-Perot cavities: stabilization and mode matching analysis", Appl. Phys. B, 2016, 14 pgs.

Leibrandt, et al., "Field-test of a robust, portable, frequency-stable laser", Optics Express 19, 11, May 23, 2011, 9 pgs.

Ludlow, et al., "Compact, thermal-noise-limited optical cavity for diode laser stabilization at 1 X 10-15", Optics Letters, 32, 6, Mar. 15, 2007, 3 pgs.

Wang, et al., "Gas Permeability Measurement of Graphene Films", IPAC2018, 2018, 4 pgs.

Yoo, et al., "Graphene and Graphene Oxide and Their Uses in Barrier Polymers", Journal of Applied Polymer Science, 2014, 23 pgs.

Zhang, et al., "Two-Parameter Elliptical Fitting Method for Short-Cavity Fiber-Fabry-Perot Sensor Interrogation", Sensors 2019, 2019, 11 pgs.

* cited by examiner

HOUSING AN ETALON IN A FREQUENCY REFERENCE SYSTEM

BACKGROUND

The following description relates to housing an etalon in a frequency reference system.

Lasers can suffer from noise that impacts the quality of their light. Sources of such noise include acoustic coupling, temperature fluctuations, electrical power fluctuations, and perturbations of the laser cavity and gain medium. The noise may broaden the spectral bandwidth of a laser and may also cause a drift in the frequency of light emitted by the laser. Approaches for mitigating this noise typically involve operating a laser in an ambient environment that is controlled, e.g., securing the laser to an anti-vibration table, conditioning air in the ambient environment to a pre-determined temperature, and so forth. However, commercial applications often preclude such operation.

DETAILED DESCRIPTION

Figure 1:
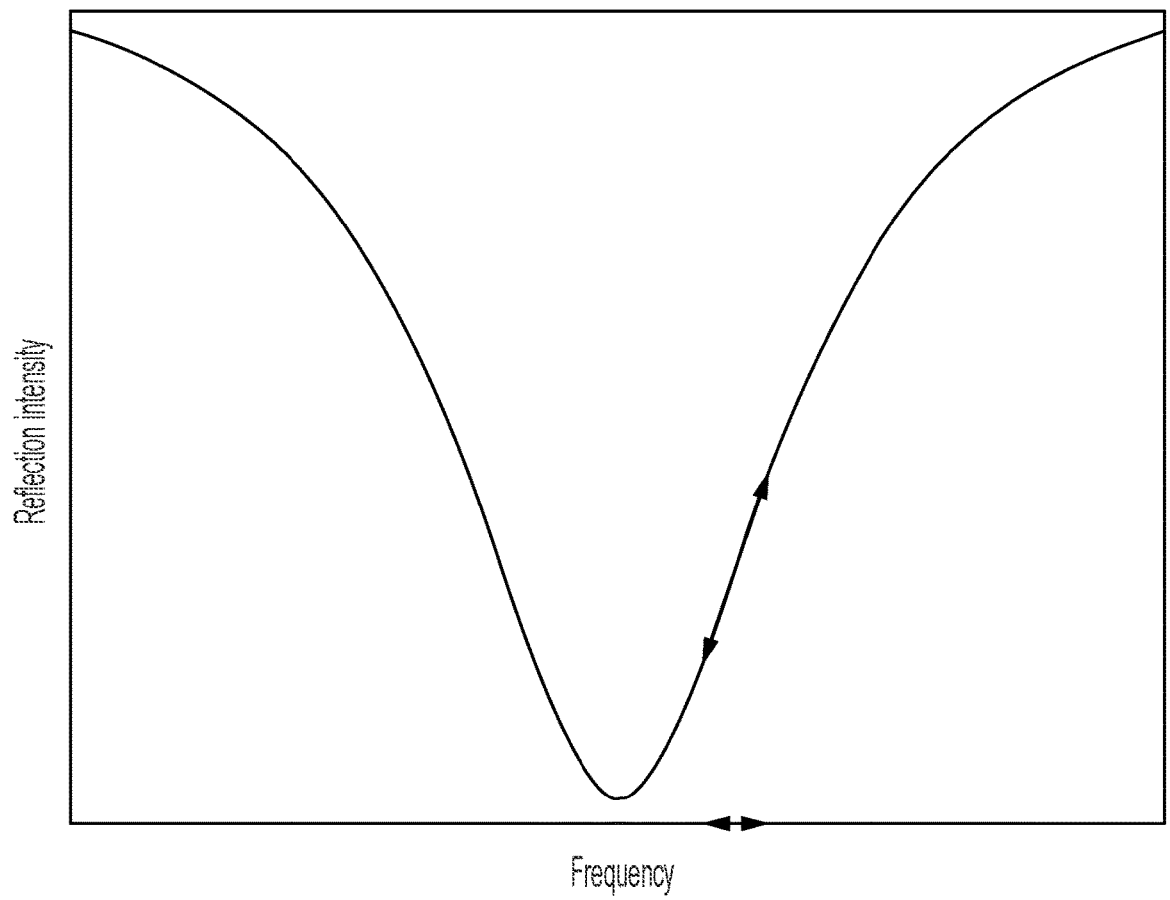
FIG. 1 is an example graph showing how an intensity of reflected light from an etalon varies with frequency.

In a general aspect, a structure houses an etalon in a frequency reference system. In some variations, the frequency reference system provides an ultra-stable frequency reference for laser light. For example, the etalon (e.g., a Fabry-Perot etalon) may be enclosed in an evacuated glass and silicon housing. Light may be guided into the device via fiber optics, eliminating the need for optical alignment by a user. Moreover, the design of the etalon and housing may minimize length fluctuations of the etalon due to temperature changes. To do so, in some instances a spacer of the etalon is made of a low thermal expansion material. The etalon may also be kept within an evacuated housing, minimizing convective heat transfer and ensuring that the etalon is predominantly heated through radiation. The device may be configured such that radiative heat transfer is much slower than convective heat transfer (if even present). In some instances, the systems and techniques described here are useful for stabilizing lasers in portable devices, particularly those which require feedback bandwidths over 5 kHz.

The technologies described here may be deployed in applications inside or outside of laboratory environments. Laser light enables many precision measurements through the application of interferometry and the exquisite control of matter it facilitates. The precise frequency, or color, of the light emitted by a single frequency laser allows such control in many cases. Frequency-stabilized lasers are beneficial in a variety of applications, including time and frequency measurement, gravimetry, electric field sensing, and magnetic field sensing. In some applications, such as gravimetry, measurements are commonly made in remote geographic locations, thus requiring portability and stability of the laser system. Other applications of frequency-stabilized lasers include tests and measurements in outer space. Due to the cost of launching instruments into outer space and the lack of accessibility, these types of applications require both extreme robustness and a compact and lightweight design.

During operation, lasers may couple to a source of noise, which may affect the quality of light produced by the lasers. Examples of noise sources include acoustic noise, temperature fluctuations, electrical power fluctuations, and perturbations of the laser cavity and gain medium. These sources of noise can broaden the spectral bandwidth of a laser and cause drift of the frequency of the laser. In a laboratory, these effects may be compensated for by active feedback controls if the frequency of the laser can be tracked relative to a stable frequency reference (e.g., an interferometer whose length is stabilized, a laser with higher frequency stability, etc.). During operation, the stable frequency reference may generate a feedback signal based on the optical frequency of the laser, which may be increased or decreased relative to the reference. The feedback signal can then be sent back to laser system, driving the optical frequency back towards the desired value.

FIG. 1 presents an example graph showing how an intensity of reflected light from an etalon varies with frequency. The etalon may be a Fabry-Pérot interferometer and the intensity of the reflected light may be used to produce an optical signal. In the example graph, the intensity of reflected light is represented by a parabolic curve. On a side of the parabolic curve, the intensity of reflected light varies approximately linearly with frequency. The intensity is larger if the frequency increases and smaller if the frequency decreases, as indicated by the arrows. Thus, positive changes of frequency can be distinguished from negative changes when a reference point is chosen, which may correspond to a setpoint. The reference point may allow active feedback control of a laser that is tracked relative to a stable frequency reference. For example, a photodiode may be used to convert the optical signal to an electrical signal that can be subsequently processed and fed back to a transducer. The transducer may, in turn, change the laser frequency, e.g., displace a laser cavity mirror to change a length of a laser cavity.

Figure 2:
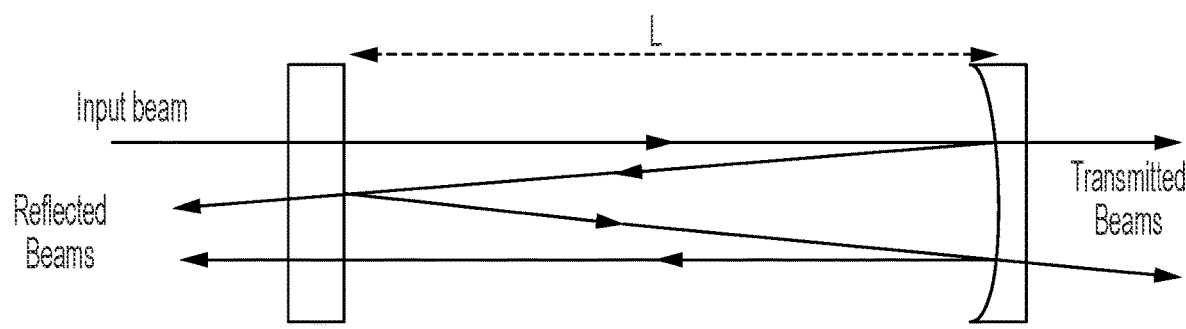
FIG. 2 is a schematic diagram an example etalon having two reflective surfaces.

In some implementations, an etalon may serve as a frequency reference. The etalon may include two reflective surfaces separated by a defined spacing, L. FIG. 2 presents a schematic diagram an example etalon having two reflective surfaces. The etalon may define part or all of an interferometer, such as a Fabry-Pérot interferometer. Each of the two reflective surfaces can be either flat or curved and may be defined by a mirror. The defined spacing between the two reflective surfaces is kept constant and may define a cavity of the etalon. Through frequency feedback schemes, cavity length's stability may be transferred to a frequency stability of the laser. Either the reflected beam or the transmitted beam from the cavity can be used for frequency stabilization. In many variations, the reflected beam is used for frequency stabilization. In these variations, the reflected beam may provide a higher bandwidth feedback than the transmitted beam.

Parameters may be used to represent properties of the etalon's cavity. Examples of the parameters include the free spectral range (FSR), the finesse, and the bandwidth. The free spectral range for a cavity, $\Delta v_{FSR}$, is the frequency spacing between successive optical transmission maxima, or reflection minima, from the cavity. For example, a Fabry-Pérot interferometer has a free spectral range because the resonances where light is transmitted through its cavity are periodic. In general, for a cavity of an etalon, the free spectral range (FSR) may be represented by Equation (1):

$$\Delta v_{FSR} = \frac{c}{2nL} \qquad \text{Eq. (1)}$$

where n is the index of refraction of the medium between the two reflective surfaces, c is the speed of light, and L is the physical separation between the two reflective surfaces.

The finesse, f, is a measure of the average number of times light will circulate in the cavity before being transmitted through an end mirror, or alternatively, be absorbed or scattered. A higher magnitude for the finesse can result in higher spectral resolution because more reflected beams need to meet the interference condition for transmission through the cavity. For high finesse cavities, such as those used for laser frequency stabilization, the finesse depends almost entirely on the reflectivity of the two reflective surfaces. In general, the finesse of an etalon cavity of may be represented by Equation (2), which neglects losses inside the cavity (e.g., due to absorption or scattering):

$$f = \frac{\pi\sqrt{R}}{(1-R)} \qquad \text{Eq. (2)}$$

Here, R is the reflectivity of the two reflective surfaces and can range from 0 to 1. As shown by Equation (2), a high finesse results when the reflectivity is close to 1. The finesse of a cavity is limited by manufacturing constraints since reflective surfaces (e.g., mirror surfaces) cannot be made infinitely smooth and reflective coatings cannot be made to have perfect reflectivity (or an arbitrarily high reflectivity). As such, limits on a magnitude of the finesse may be on the order of tens of thousands to hundreds of thousands for macroscopic Fabry-Perot resonators.

Figure 3:
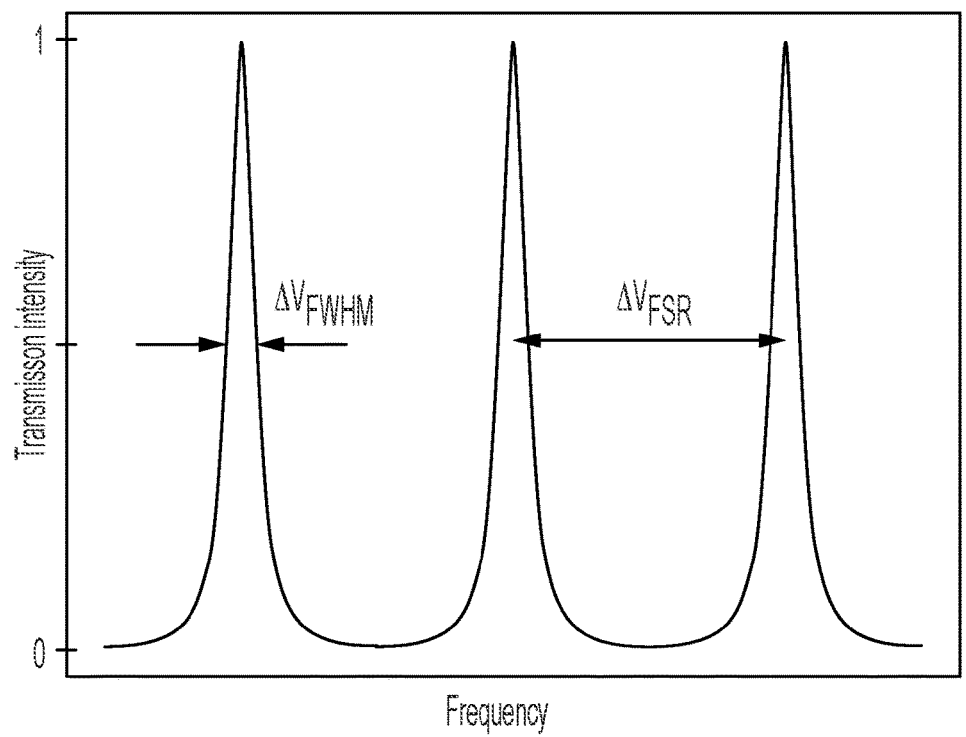
FIG. 3 is an example graph showing how the transmission peaks of an etalon vary with frequency.

A bandwidth of the etalon cavity, $\Delta v_{FWHM}$, is a measure of the spectral width of a transmission peak through the cavity. The bandwidth may be represented by Equation (3):

$$\Delta v_{FWHM} = \frac{\Delta v_{FSR}}{f} \qquad \text{Eq. (3)}$$

where $\Delta v_{FSR}$ is the free spectral range of the cavity and f is the finesse of the cavity. FIG. 3 presents an example graph showing how the transmission peaks of an etalon vary with frequency. The example graph is labeled to indicate the bandwidth, $\Delta v_{FWHM}$, and the free spectral range, $\Delta v_{FSR}$. The etalon may be a Fabry-Pérot interferometer and the frequency may correspond to a frequency of light emitted by a laser. The bandwidth of the cavity may play an important role in the frequency stabilization of lasers. For example, narrower bandwidths may be difficult to make use of but allow for tighter frequency stabilization of laser light. Since the magnitude of the finesse is typically limited by manufacturing constraints, a narrow bandwidth may limit the allowable free spectral range, thus requiring cavities to have a minimum length, typically on the order of several cm or more.

For frequency reference applications (e.g., frequency stabilization), the optical path length between the two reflective surfaces of the etalon should be kept as constant as possible. Ideally, the optical path length should be perfectly constant. The optical path length is the product of the index of refraction of the medium between the two reflective surfaces, n, and the physical length between the two reflective surfaces, L. As such, the index of refraction and physical length (or their product) need to be held as fixed as possible to prevent drift and noise from being transferred to light traversing the cavity.

Figure 4:
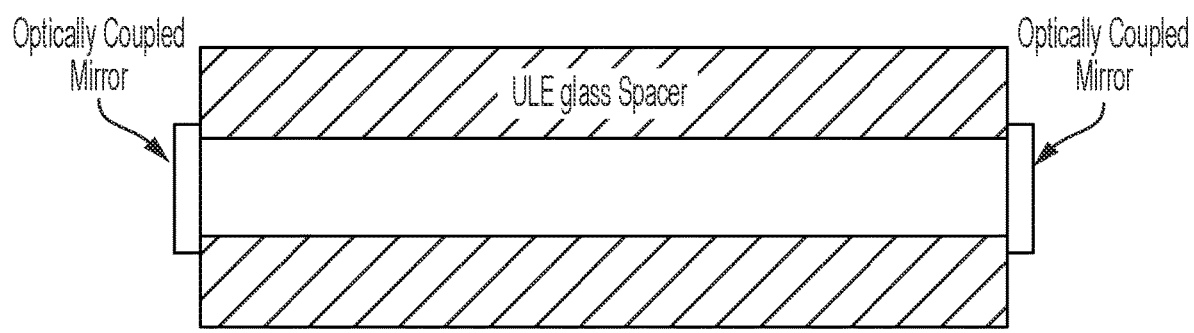
FIG. 4 is a schematic diagram of an etalon that includes two mirrors separated by a spacer formed of ultralow thermal expansion (ULE) glass.

In some implementations, the physical length is kept stable by minimizing changes in the cavity length due to thermal expansion. Such expansion is typically the largest cause of changes in physical length. In these implementations, the cavity may be fabricated with two end mirrors separated by a spacer made of an ultralow thermal expansion (ULE) glass. FIG. 4 presents a schematic diagram of an etalon that includes two mirrors separated by a spacer formed of ultralow thermal expansion (ULE) glass. The etalon may define part or all of a Fabry-Pérot interferometer. The ULE glass may be manufactured to have a first order thermal expansion coefficient of about $10^{-6}$ to $10^{-7}$ at a temperature that is slightly above room temperature (e.g., slightly above 300 K). This temperature may correspond to a zero-crossing point of the coefficient of thermal expansion for the ULE glass.

In further implementations, the cavity may be kept at the zero-crossing point temperature to further reduce length changes due to exchanges of heat with the ambient environment. Minimizing the impact of vibrations may also help improve the length stability of the cavity. In some implementations, the index of refraction, n, is fixed by keeping the cavity in an evacuated housing. In these implementations, n may be approximately 1 (e.g., n≅1). In some variations, a vacuum of $10^{-3}$ to $10^{-7}$ Torr is applied to the housing to allow laser applications requiring less than 10 kHz laser linewidths with little to no drift. In some implementations, the evacuated housing minimizes convective heat transfer from the housing to the cavity. If conductive heat transfer is also kept low, the etalon is heated primarily by radiation emanating from the housing, which is a slow process. Such controlled heat transfer allows the etalon to be less sensitive to temperature fluctuations on the housing surface.

In current-laboratory based systems, a stainless-steel housing is used for ultrastable etalons, such as Fabry-Pérot interferometers. Stainless steel outgasses (as do other metals), so these types of housings must be pumped continuously to maintain vacuum conditions inside. In some implementations, the systems described herein include a housing for an etalon made of silicon and thick glass that is permanently sealed after evacuation. The silicon and glass housing components may be anodically bonded together, providing vacuum tight seals free of epoxies or other binders which could outgas. However, other bonding methods are also possible (e.g., contact bonding). Moreover, low outgassing materials are used inside the housing for the etalon and internal supports that serve its holder.

In many implementations, the glass and silicon housing define a low outgassing structure that may allow the system to remain at high vacuum (e.g., less than $10^{-3}$ torr) for extended periods of time (e.g., greater than one year) without pumping. The presence of a vacuum increases the frequency reference stability both by maintaining the cavity refractive index at approximately unity and by thermally isolating the cavity from temperature fluctuations of the housing. In some implementations, the etalon can be coupled through transparent windows in the housing by fiber optics. The use of fiber optic coupling (as compared to free space optics) may result in a more stable system because the alignment changes less over time. The use of fiber optic coupling, elimination of active vacuum pumping, and a slow time constant for cavity frequency shifts make this housing suitable for field-deployable frequency references. The housing may thus allow more compact, robust, stable, and power-efficient frequency-reference systems.

Frequency-reference devices that are stable, portable, robust, and easy-to-use can be beneficial both inside research laboratories and in field applications. Etalons are an effective way to frequency stabilize lasers. In some variations, the etalons are defined by a Fabry-Pérot cavity or interferometer. Compared to other interferometric references, Fabry-Perot based stabilization schemes require little signal processing and allow for very large feedback bandwidths when used in reflection mode. The Fabry-Perot cavity is also one of the simplest interferometers to implement since the cavity can be constructed from two mirrors and a spacer. Fabry-Pérot cavities represent an excellent option for frequency references in field environments, especially when optically coupled to lasers that must be tuned over broad ranges of wavelength or between different atomic or molecular transitions. In research applications, Fabry-Perot cavities may allow lasers to achieve very high frequency stability, even to linewidths of about 1 Hz. However, some conventional Fabry-Pérot interferometers have a large footprint and operate in connection with additional infrastructure, such as free space optics, vacuum chambers and vacuum pumps to function.

A frequency reference device or system that can maintain high stability, but with a more field-oriented form factor, is valuable in a variety of different applications. Such devices or systems, for example, may eliminate free space optics. Free space optics typically require substantial space, as they usually include an optical breadboard or cage-mount system in order to position the optics. Compared to fiber optics, free-space optics are more sensitive to vibrations and are less stable in alignment over the long term. Fewer or no free space optics results in a more compact and stable system.

In another example, the technologies described herein may eliminate active pumping of an evacuated volume in the etalon. Vacuum pumps are sizable and typically require electrical power. Ion pumps, which due to their low maintenance are the pump of choice for Fabry-Pérot laser stabilization systems, typically require voltages on the order of a few kV. Additionally, ion pumps may stop working if the vacuum pressure inside the evacuated volume becomes too high. If the pump is turned off for too long (e.g., a loss of electrical power), the vacuum pressure inside the evacuated housing can rise enough that the ion pump becomes non-functional. Passive pumps, such as getter pumps, usually lack the pumping speed to be used for frequency reference applications. In some implementations, the technologies described herein eliminate the need for active pumping by sealing the etalon in an evacuated glass and silicon housing. The housing may also be coated with a layer highly impermeable to gaseous atoms, molecules, or both. Eliminating the use of mechanical seals means that permeation through the housing may be the only mechanism by which the vacuum pressure can increase.

In yet another example, the devices or systems may allow for a compact and robust housing. For many applications, smaller and lighter footprints make it easier to integrate instruments into a larger system. The ability to withstand some level of vibration and temperature fluctuation are also important for a field-deployable instrument. In some implementations, the systems described herein include a Fabry-Perot interferometer mounted in a solid glass and silicon housing with only ceramic mounting structures and fiber optics inside the housing. Such an assembly can be placed in a housing padded on its exterior surfaces with foam or other thermally insulating and vibration damping materials. The level of environmental isolation can be scaled to the anticipated environment and to the desired level of stability.

Frequency-reference systems may provide a portable, ultrastable frequency reference for lasers. In some variations, the frequency reference is based on an etalon, such as a Fabry-Perot interferometer, held inside a glass and silicon vacuum cell. One or more lasers may be coupled into the etalon. Moreover, one or both of the transmitted or reflected beams may be coupled out of the cavity. Light reflected from (or transmitted through) the etalon may be used to discriminate a frequency of the laser and then actively adjust the frequency back towards a set point. Existing schemes for laser frequency stabilization to an etalon, such as the Pound-Drever-Hall method or side of fringe locking, can be used to adjust the frequency back towards the set point. In many implementations, the frequency-reference systems described here may allow the combination of high optical path length stability with fiber-coupled alignment. The frequency-reference systems may also allow an evacuated housing that does not require active pumping to maintain a vacuum therein.

Figure 5:
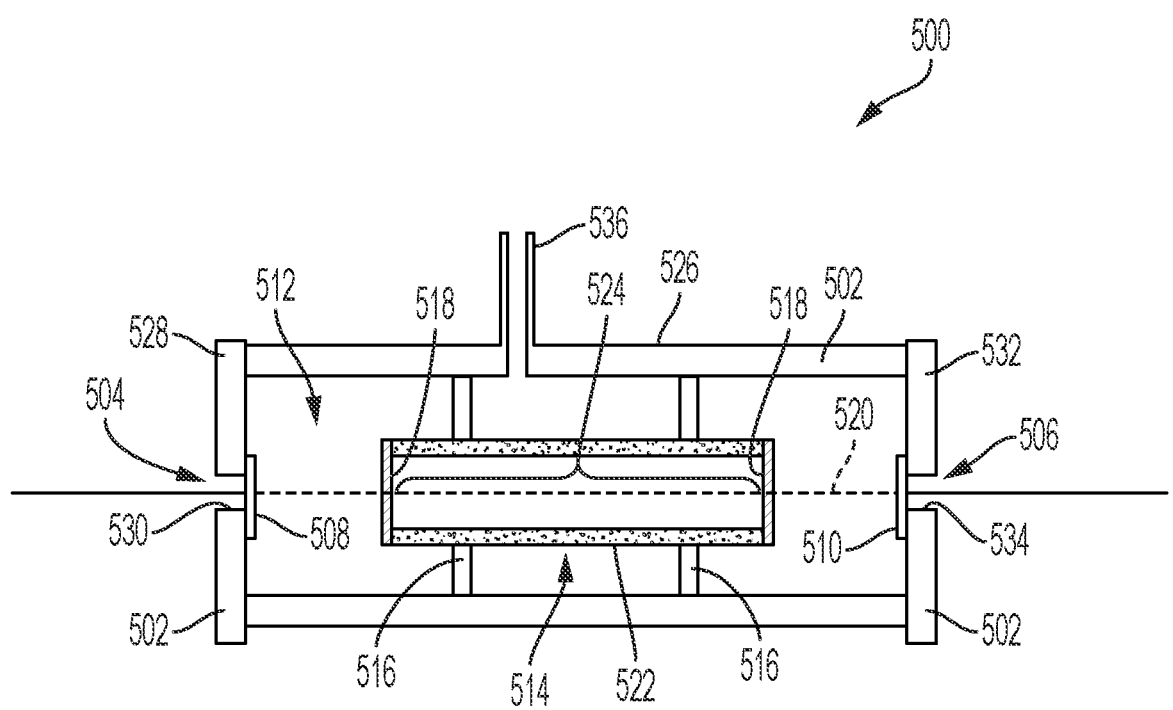
FIG. 5 is a schematic diagram is presented of an example device for providing a reference frequency of light.

Now referring to FIG. 5, a schematic diagram is presented of an example device 500 for providing a reference frequency of light. The example device 500 includes a housing 502 having a first and second openings 504, 506 and formed of a ceramic material. The ceramic material may be a glass material (e.g., vitreous silica, borosilicate glass, etc.), although other ceramic materials are possible. In some instances, the ceramic material has a thermal conductivity no greater than 5 W/m·K at room temperature. As used herein, the term "room temperature"—when associated with a material property, such as a thermal conductivity or thermal expansion coefficient—refers to a temperature at or about 300 K. The device also includes a first optical window 508 covering the first opening 504 and coupled to the housing 502 through a first ceramic bond that forms a hermetic seal around the first opening 504. The device additionally includes a second optical window 510 covering the second opening 506 and coupled to the housing 502 through a second ceramic bond that forms a hermetic seal around the second opening 506. The first and second optical windows 508, 510 may be formed of glass, and in some variations, may be anti-reflection coated to improve the transmission of light therethrough.

The first and second ceramic bonds are based on ionic bonds, covalent bonds, or some combination thereof, that chemically join their respective optical windows—e.g., the first optical window 508 or the second optical window 510—to the housing 502. In many implementations, the optical windows and the housing 502 are both formed of ceramic material (e.g., silicon, borosilicate glass, alumina, silica, etc.). The first and second ceramic bonds may be formed by reacting a surface of a respective optical window to a mating surface of the housing 502. This process may include contacting the surfaces. For example, the surfaces may be treated chemically and then contacted to form the ceramic bond (e.g., a contact bond process). Heat may be applied, if needed, to assist in forming the ceramic bond. In another example, the surfaces may be contacted and then one or both of heat and an electric field may be applied to form the ceramic bond (e.g., an anodic bonding process). In some variations, the formation of the ceramic bond is assisted by an intermediate compound that contains ceramic material (e.g., a glass frit). The intermediate compound may be applied to one or both surfaces before they are contacted. Subsequent application of an energetic stimulus (e.g., heat) drives the formation of the ceramic bond (e.g., through melting of the glass frit).

An evacuated volume 512 is enclosed by the housing 502, the first optical window 508, and the second optical window 510. Such enclosure may, in some instances, involve the contribution of the ceramic bonds and other minor components. The evacuated volume 512 may have a vacuum pressure no greater than a threshold vacuum pressure, such as $10^{-3}$ torr. In some variations, the evacuated volume 512 has a vacuum pressure no greater than $10^{-3}$ torr. In some variations, the evacuated volume 512 has a vacuum pressure no greater than $10^{-4}$ torr. In some variations, the evacuated volume 512 has a vacuum pressure no greater than $10^{-5}$ torr. In some variations, the evacuated volume 512 has a vacuum pressure no greater than $10^{-6}$ torr.

In some implementations, the housing 502 and the first and second optical windows 508, 510 may be configured to allow the evacuated volume to stay below the threshold vacuum pressure over a predetermined period, such as no less than 1 year. The ceramic bonds and other minor components may also be configured to contribute to this capability. For example, the ceramic bonds may define a hermetic seal. The predetermined period may correspond to an operational lifetime of the example device 500. In some variations, the housing 502 and the first and second optical windows 508, 510 are configured to allow the evacuated volume 512 to maintain the threshold vacuum pressure (or lower) for at least one year. In some variations the housing 502 and the first and second optical windows 508, 510 are configured to allow the evacuated volume 512 to maintain the threshold vacuum pressure (or lower) for at least three years. In some variations, the housing 502 and the first and second optical windows 508, 510 are configured to allow the evacuated volume 512 to maintain the threshold vacuum pressure (or lower) for at least five years. In some variations, the housing 502 and the first and second optical windows 508, 510 are configured to allow the evacuated volume 512 to maintain the threshold vacuum pressure (or lower) for at least ten years.

The device 500 includes an etalon 514 is disposed within the evacuated volume 512. The device 500 also includes one or more supports 516 suspending the etalon 514 in the evacuated volume. The one or more supports are formed of a material having a thermal conductivity no greater than 5 W/m·K at room temperature. In some instances, one or more supports are formed of a material having a thermal conductivity no greater than 3 W/m·K at room temperature. In some instances, one or more supports are formed of a material having a thermal conductivity no greater than 1 W/m·K at room temperature. In some instances, one or more supports are formed of a material having a thermal conductivity no greater than 0.5 W/m·K at room temperature. In some instances, the material forming the one or more supports is a ceramic material. Although FIG. 5 depicts the device 500 as having two supports 516, other numbers of supports are possible.

In some implementations, the etalon 514 includes two reflective surfaces 518 on an optical path 520 through the evacuated volume 512 from the first optical window 508 to the second optical window 510. The two reflective surfaces 518 may be defined by respective mirrors. The etalon 514 also includes a spacer 522 separating the reflective surfaces from each other and configured to set an optical length 524 therebetween. The optical length 524 is part of the optical path. In some variations, the spacer 522 is formed of a material having a thermal expansion coefficient less than $10^{-5}$ per Kelvin at room temperature. For example, the spacer 522 may be formed of an ultra-low expansion (ULE) glass. In some variations, the spacer 522 is formed of a material having a zero-crossing temperature of the coefficient of thermal expansion. The zero-crossing temperature may correspond to a temperature at which the thermal expansion of the material is zero along one or more directions when the material absorbs or loses heat. In some instances, the zero-crossing temperature is greater than 15° C. In some instances, the zero-crossing temperature is greater than 20° C. In some instances, the zero-crossing temperature is greater than 25° C. In some instances, the zero-crossing temperature is greater than 30° C.

In some implementations, such as shown in FIG. 5, the housing 502 includes a cylindrical tube 526 having first and second open ends. The housing 502 also includes a first plate 528 covering the first open end and coupled to the cylindrical tube 526 through a third ceramic bond that forms a hermetic seal around the first open end. The first plate 528 includes a first hole 530 that serves as the first opening 504 of the housing 502. The housing 502 also includes a second plate 532 covering the second open end and coupled to the cylindrical tube 526 through a fourth ceramic bond that forms a hermetic seal around the second open end. The second plate 530 includes a second hole 534 that serves as the second opening 506 of the housing 502. The ceramic bonds described in relation to the first and second plates 528, 532 may be analogous to the ceramic bonds described in relation to the first and second optical windows 508, 510.

In some implementations, the cylindrical tube 526 is formed of glass. The walls of the cylindrical tube 526 may be selected with a thickness to reduce helium permeation into the evacuated volume 512 (e.g., 7 mm thick). In these implementations, the cylindrical tube 526 may include a hollow stem 536—also formed of glass—extending from a hole in the cylindrical tube 526. The hollow stem 536 extends a passage formed by the hole that connects an interior of the cylindrical tube 526 to an ambient environment. The hollow stem 536 may be coupled to a pump during fabrication of the device 500 to establish a vacuum pressure in the evacuated volume 512. After the vacuum pressure is reached, the hollow stem 536 may be fused shut to seal the vacuum pressure in the evacuated volume 512. In some implementations, the first and second plates 528, 532 are formed of silicon. The first and second plates may be selected with a thickness to reduce helium permeation into the evacuated volume 512 (e.g., 3 mm thick). In implementations where the cylindrical tube 526 is formed of glass and the first and second plates 528, 532 are formed of silicon, the first and second plates 528, 532 may be bonded to the first and second open ends of the cylindrical tube 526, respectively, through anodic bonds. Anodic bonds may create a robust, vacuum tight seal without the need for epoxies or other fillers which could leak, degrade, or outgas. However, other types of bonds are possible (e.g., contact bonds).

In some implementations, the first and second plates 528, 532 are formed of glass. In implementations where the cylindrical tube 526 is also formed of glass, the first and second plates 528, 532 may be joined to the cylindrical tube 526 using butt seals or glass frit bonding. Other types of bonds are possible.

Figure 6:
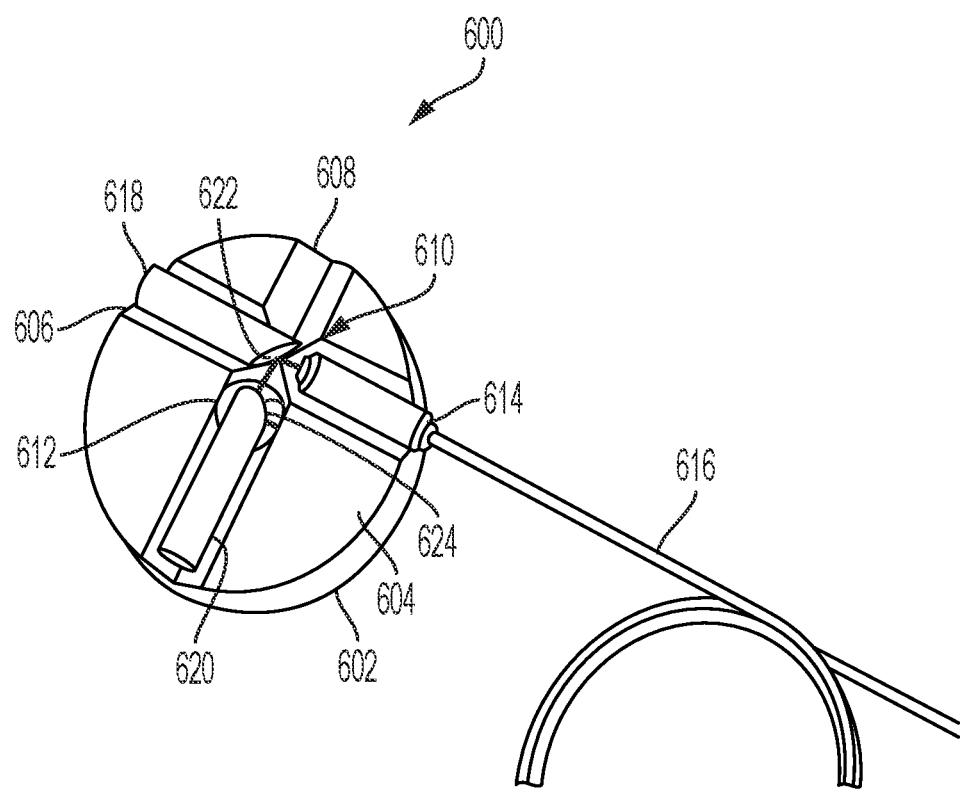
FIG. 6 is a schematic diagram, shown in perspective view, of an example optical assembly for optically coupling an etalon to an optical window.

In some implementations, the device 500 includes an optical assembly optically coupled to the etalon 514. FIG. 6 presents a schematic diagram, shown in perspective view, of an example optical assembly 600 for optically coupling an etalon to an optical window. The example optical assembly 600 includes an alignment plate 602 having a planar surface 604 with first and second grooves 606, 608 therein. The alignment plate 602 may be formed of silicon and the first and second grooves 606, 608 may have a V-shaped cross section. The first and second grooves 606, 608 are oriented perpendicular to each other and having an intersection 610 adjacent a hole 612 in the second groove 608. The hole 612 extends through the alignment plate 602. The example optical assembly 600 also includes a collimator 614 disposed in the first groove 606 that includes an optical fiber 616 and a lens (e.g., a gradient index lens). The lens is configured to focus light along the first groove 606.

The example optical assembly 600 additionally includes a first rod 618 and a second rod 620. The first rod 618 is disposed in the first groove 606 and has an end defined by a first reflective face 622. The first reflective face 622 is oriented to receive light from the lens of the collimator 614 and redirect the light along the second groove 608. The second rod 620 is disposed in the second groove 608 and has an end defined by a second reflective face 624. The second reflective face 624 is oriented to receive light from the first reflective face 622 and redirect the light through the hole. The first and second grooves 606, 608 are configured to allow the first and second rods 618, 620, respectively, to translate and rotate. Such motion allows the first and second rods 618, 620 to be aligned during assembly.

Figure 7A:
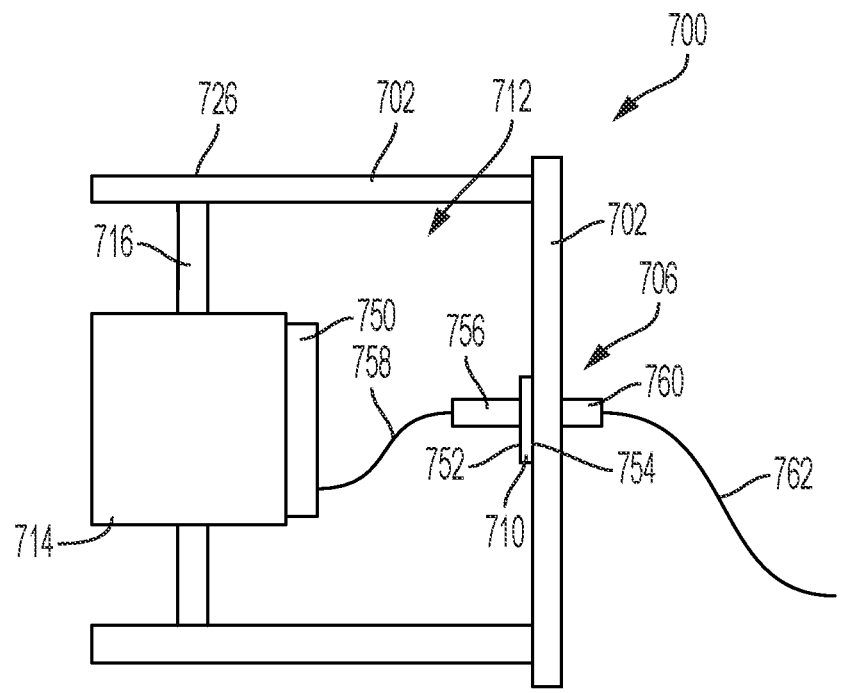
FIG. 7A is a schematic diagram, shown in detail view, of part of the example device of FIG. 5, but in which an optical assembly optically couples an etalon to an optical window.

Now referring back to FIG. 5, in some implementations, the example device 500 may include an optical assembly that optically couples the etalon 514 to an optical window, such as the first optical window 508 to the second optical window 510 of the device 500. In these implementations, the etalon 514 includes first and second mirrors on the optical path 520. The first and second mirrors may define, respectively, the two reflective surfaces 518 of the etalon 514. One or both of the first and second mirrors may have an instance of the optical assembly coupled thereto. The instance of the optical assembly is within the evacuated volume 512. FIG. 7A presents a schematic diagram, shown in detail view, of part of the example device 500 of FIG. 5, but in which an optical assembly 750 optically couples the etalon 714 to the second optical window 710. The optical assembly 750 is within an evacuated volume 712. Features common to both FIGS. 5 and 7A are related via coordinated numerals that differ in increment by two hundred. The optical assembly 750 of FIG. 7A may be analogous to the example optical assembly 600 described in relation to FIG. 6.

The second optical window 710, which is adjacent the optical assembly 750 includes a first window surface 752 opposite a second window surface 754. The first window surface 752 is exposed to the evacuated volume 712 and the second window surface 754 is exposed to an exterior of the housing 702. The second optical window 710 also includes a first collimation package 756 in the evacuated volume 712 that optically couples the first window surface 752 to the optical fiber 758 of the optical assembly 750. The first collimation package 756 includes a first lens (e.g., a gradient index lens). The second optical window 710 additionally includes a second collimation package 760 exterior to the housing 702 and optically coupled to the second window surface 754. The second collimation package 760 includes a second lens (e.g., a gradient index lens) and a second optical fiber 762. In some instances, the second optical fiber 762 is coupled to a source of laser light (e.g., a laser system).

Figure 7B:
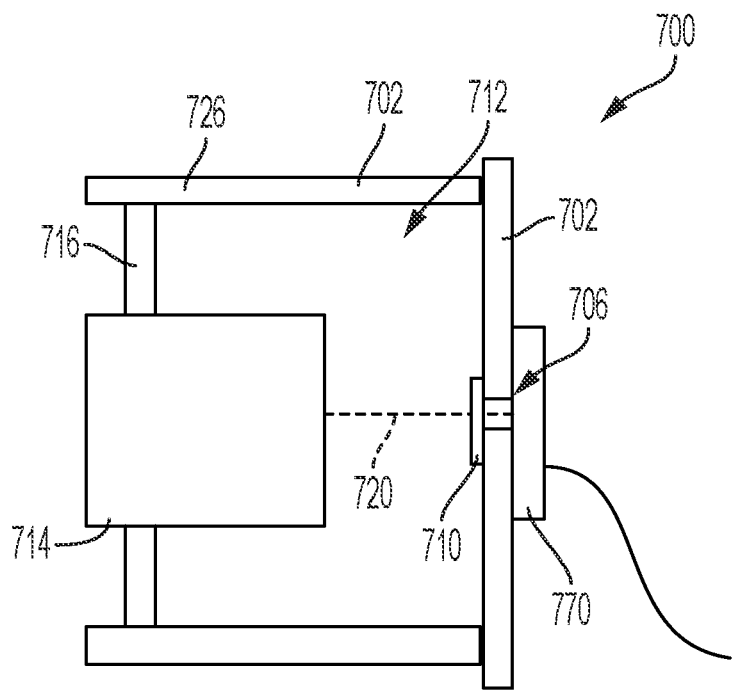
FIG. 7B is a schematic diagram, shown in detail view, of part of the example device of FIG. 5, but in which an optical assembly is coupled to an exterior of a housing and is aligned with an opening of the housing.

Now referring back to FIG. 5, in some implementations, the example device 500 may include an optical assembly coupled to an exterior surface of the housing 502. In these implementations, one or both of the first opening 504 and the second opening 506 of the housing 502 have an instance of the optical assembly associated therewith. Moreover, the hole of the instance is aligned with an associated opening, i.e., the first opening 504 or the second opening 506, to allow the optical assembly to optically couple to the optical path 520. FIG. 7B presents a schematic diagram, shown in detail view, of part of the example device 500 of FIG. 5, but in which an optical assembly 770 is coupled to an exterior of the housing 702 and aligned with the second opening 706. Features common to both FIGS. 5 and 7B are related via coordinated numerals that differ in increment by two hundred. The optical assembly 770 of FIG. 7B may be analogous to the example optical assembly 600 described in relation to FIG. 6. During operation, the optical assembly 770 is in optical communication with the etalon 714 and may exchange optical signals along the optical path 720.

For robustness and ease of use, the optics of the systems described herein may be aligned and secured in place (e.g., via epoxy) during fabrication so no optical alignment by the user is necessary. The user need only to connect a laser source to an optical fiber on the outside of the frequency-reference housing. Where free space propagation is necessary, miniature optics can be used and epoxied to a stable substrate. The total free space propagation of each of the laser beams may be 1-3 cm depending on the placement of the optics. However, other distances are possible. Fiber optic circulators may be used to separate the reflected signal from the input signal. The fiber optic circulator may be low loss, polarization insensitive, and more stable than free space optics alternatives.

For the frequency-reference system to maintain vacuum without active pumping, metal materials may be eschewed for ceramic materials (e.g., a glass material). By forming the housing out of ceramic materials, outgassing into the evacuated volume of the housing may be significantly reduced or eliminated. In some variations, the housing includes a thick glass tube with a cap on each end made of silicon. The silicon may be attached to the glass by processes of anodic bonding. Anodic bonding can produce a seal that is strong and vacuum tight. In such cases, no binders or epoxies are required, which may be sources of outgassing. A glass stem attached to the thick glass tube may be used to evacuate an enclosed volume associated with the housing. For example, a pump may be coupled to the glass tube to evacuate the interior volume to the desired vacuum level. After the housing is evacuated, the glass stem is collapsed by heating it with a flame, sealing the evacuated housing.

In some implementations, the spacer 522 of the etalon 514 is formed of an ultralow expansion material (e.g., Zerodur® glass, which is a commercial product of Schott). The ultralow expansion material may allow the spacer 522 to keep the etalon 514 at a stable length when temperature changes. In some implementations, the one or more supports are made of a machinable ceramic (e.g., Macor®, which is a product of Corning). The machinable ceramic has low thermal conductivity so negligible heat is exchanged between the etalon 514 and the housing 502. The vacuum surrounding the etalon 514 minimizes convective heat transfer, leaving radiation as the dominant mode of heat transfer from the housing 502 to the etalon 514. Once thermal equilibrium is reached, the radiative heat transfer is so slow that the etalon 514 is almost completely immune to instantaneous fluctuations of the environmental temperature. If the time constant is slow enough, the locking frequency of an off-set lock can be adjusted by reference to another frequency reference on the fly, or temperature sensors can be used such to feed forward the etalon length change, hence frequency shift. Off-set locking operations and feed-forward operations are described in further detail in relation to FIGS. 9-12.

In some implementations, the example device 500 is placed in a box to provide environmental isolation. Foam may be placed inside the box to provide thermal insulation. The foam may also provide damping from vibrations. It is possible to use other materials, similar to foam, for vibrational damping and insulation. Depending on the desired level of frequency stability from the etalon, the housing 502 around the etalon 514 can be thermally controlled to a varying degree. For some applications, particularly when the timescale of the desired measurements is small compared to the timescale of the etalon's thermal drift, thermally insulation around the housing 502 is sufficient for temperature control. One example could be if the target laser was referenced to a slow absolute frequency reference such as a wavemeter. The wavemeter readings could be used to correct the drift of the cavity provided the drift was slow compared to the speed at which the wavemeter could be readout. For more demanding applications, a heater and temperature controller can be used to keep the housing at a stable temperature. Use of a cooler is also possible. For the most stable operation, the housing temperature should be actively controlled and chosen such that the spacer 522 is at its zero-crossing temperature. In some applications it may also be beneficial to monitor the housing temperature and correct or pre-compensate for some temperature-related drift.

In some implementations, the example device 500 includes a radiation shield disposed in the evacuated volume 512 between an inner surface of the housing 502 and the etalon 514. In some instances, the radiation shield is wrapped around the etalon 514. The radiation shield may be formed of a material having a low emissivity and may also exhibit very low outgassing. For example, the material may have an emissivity no greater than 0.2. The material may also have less than 1.00% total mass loss (TML) and less than 0.10% collected volatile condensable materials (CVCM) when tested according to ASTM-E595-93. In some instances, the material is a polymer film formed of Kapton that is metallized on one or both sides. The emissivity of a metallized size may be less than 0.1 (e.g., about 0.05) and an emissivity of a Kapton side (if present) may be less than 1.0 (e.g., about 0.6). During operation, the radiation shield may serve to suppress radiative heat transfer between the housing 502 and the etalon 514. In this capacity, the radiation shield may reflect heat radiating from the housing 502 towards the etalon 514 back out of the housing 502. Such redirection could further reduce the speed at which the etalon 514 responds to temperature changes of the housing 502. In some implementation, the ceramic material forming the housing 502 is a ceramic material having a metallized coating on a surface interior to the housing 502. For example, the ceramic material could be a borosilicate glass that defines a tubular shape and has a silver metallic coating on an interior surface of the tubular shape. The silver-coated interior surface may have an emissivity ranging between 0.02-0.08.

The example device 500 includes the following advantages in combination: [1] The example device 500 does not require active pumping to maintain the evacuated volume, [2] the example device 500 is pre-aligned such that the user needs only to connect optical fibers to the input, [3] a fiber circulator(s) allows the collection of the signal light without resorting to free space optics, [4] the use of an ultra-low expansion material for the spacer 522 reduces the sensitivity to thermal expansion, [5] the example device 500 can be operated at its zero-crossing temperature for added stability, [6] the one or more supports 516 reduce the thermal drift by isolating the etalon 514 from temperature changes of the environment, and [7] the etalon 514 is predominantly heated by radiative coupling to the housing 502 due to the evacuated volume 512 and thermal isolation provided by the one or more supports 516. In many implementations, the example device 500 addresses the problem of locking lasers in fieldable devices that need narrow bandwidth, single frequency lasers.

Figure 8:
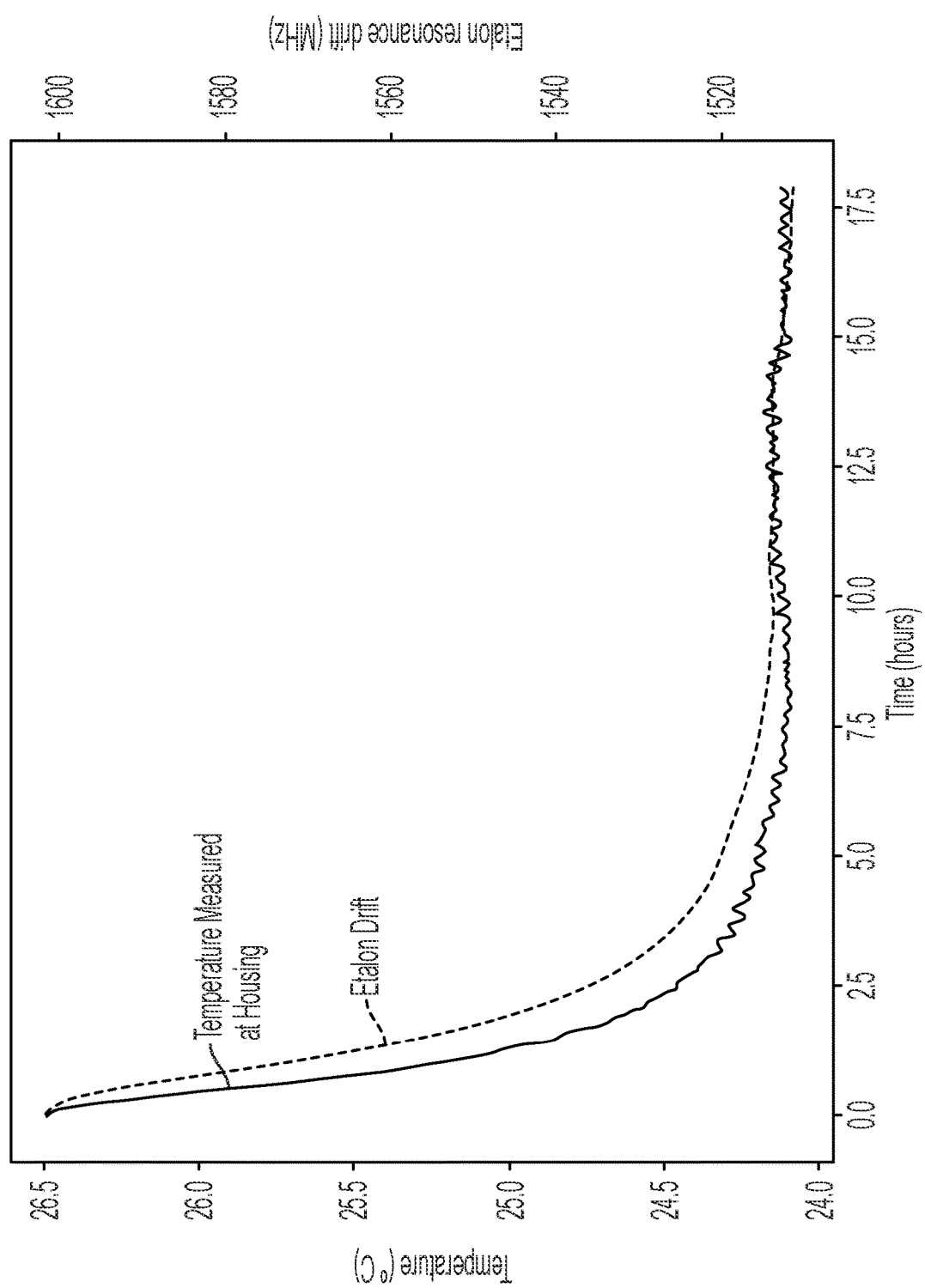
FIG. 8 is a graph of a response of the example device of FIG. 5, over time, to a sudden change in environmental temperature.

FIG. 8 presents a graph of a response of the example device 500 of FIG. 5, over time, to a sudden change (e.g., a decrease) in environmental temperature. The graph includes a left-side ordinate indicating degrees of temperature (i.e., ° C.) and a right-side ordinate indicating a magnitude of frequency (i.e., MHz). FIG. 8 corresponds to an implementation of the example device 500 in which the housing 502 includes the cylindrical tube 526 and the first and second plates 528, 532. The cylindrical tube 526 is formed of glass and the first and second plates 528, 532 are formed of silicon. A solid line shows a temperature of the housing 502 responding, over time, to the sudden change in environmental temperature, and a dashed line shows a drift of the resonance frequency of the etalon 514 relative to the temperature of the housing 502.

FIG. 8 shows that, relative to the temperature of the housing 502, the resonance frequency of the etalon 514 is delayed in time. Moreover, the curve representing the resonance frequency is notably smoother than the curve representing the temperature of the housing 502. Small modulations in the temperature data are not evident in the frequency data. Such behavior is a result of the housing 502 being thermally isolated from the etalon 514, which leads to an overall more stable resonance frequency of the etalon 514.

Figure 9:
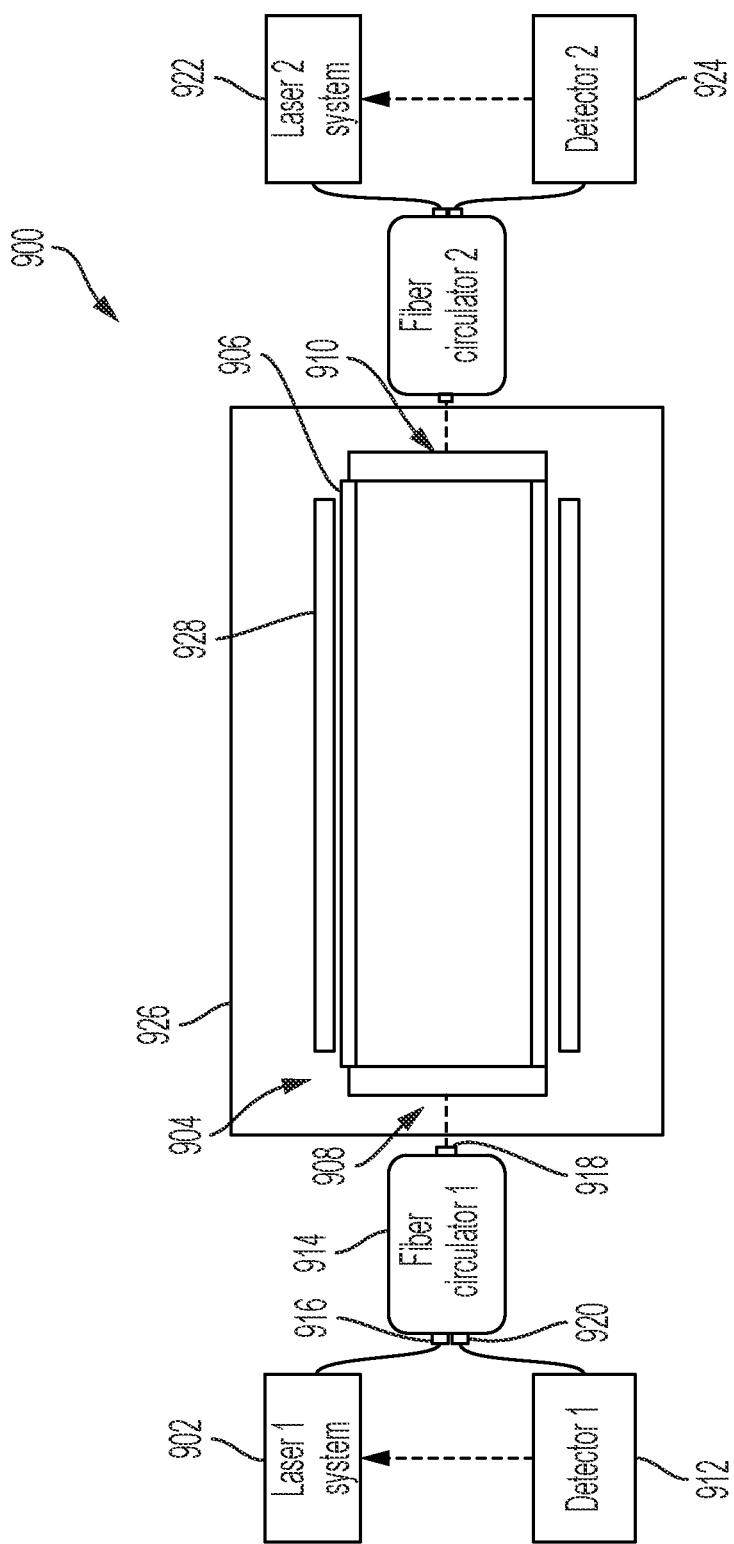
FIG. 9 is a schematic diagram of an example frequency reference system.

Now referring to FIG. 9, a schematic diagram is presented of an example frequency reference system 900. In FIG. 9, dotted black lines represent electrical connections and solid black represent fiber optic connections. The example frequency reference system 900 includes a laser system 902 configured to generate an input optical signal. The example frequency reference system 900 also includes an interferometer 904 configured to receive the input optical signal and generate an output optical signal in response. In some instances, the interferometer 904 is a Fabry-Pérot interferometer. The interferometer 904 includes a housing 906 having first and second optical ports 908, 910 and formed of ceramic material. The housing 906 encloses an evacuated volume. In some instances, the ceramic material has a thermal conductivity no greater than 5 W/m·K at room temperature. The interferometer 904 also includes an etalon disposed along an optical path through the evacuated volume from the first optical port 908 to the second optical port 910. The interferometer 904 additionally includes one or more supports suspending the etalon in the evacuated volume. The one or more supports are formed of a material having a thermal conductivity no greater than 5 W/m·K at room temperature. The material may be a ceramic material. In many variations, the interferometer 904 is analogous to the example device 500 described in relation to FIG. 5. In some variations, the output optical signals are collected from the interferometer 904 in reflection mode. In some variations, the output optical signals are collected from the interferometer 904 in transmission mode through the interferometer 904.

The example frequency reference system 900 additionally includes a detector 912 and a control system (not shown). The detector 912 is configured to receive the output optical signal and generate a detector signal in response. The detector signal represents frequency properties of the output optical signal. The control system is in communication with the laser system 902 and the detector 912. The control system is configured to perform operations that include receiving the detector signal from the detector 912 and determining a difference in frequency between a frequency of the input optical signal and a resonance frequency of the etalon based on the detector signal. The operations also include sending a frequency-control signal to the laser system 902 representing a change in frequency of the input optical signal based on the difference. In some variations, such as shown in FIG. 9, the detector 912 includes the control system.

In some implementations, the etalon of the interferometer 904 includes first and second reflective surfaces disposed along the optical path. The etalon also includes a spacer separating the reflective surfaces from each other and configured to set an optical length therebetween, the optical length part of the optical path. The spacer may be formed of a material having a thermal expansion coefficient less than $10^{-5}$ per Kelvin at room temperature.

In some implementations, such as shown in FIG. 9, the laser system 902 and the detector 912 are optically coupled to the interferometer 904 through the same optical port (e.g., the first optical port 912). In other implementations, the laser system 902 and the detector 912 are optically coupled to the interferometer 904 through distinct (e.g., different) optical ports. In some implementations, one or both of the laser system 902 and the detector 912 are optically coupled to the interferometer 904 through a fiber circulator 914. Such optical coupling may occur through fiber optic cabling. The fiber circulator 914 includes a first circulator port 916 optically coupled to the laser system 902 and a second circulator port 918 optically coupled to the first optical port 908 or second optical port 910 of the interferometer 904. In FIG. 9, the second circulator port 918 is depicted as optically coupled to the first optical port 908. The fiber circulator 914 also includes a third circulator port 920 optically coupled to the detector 912.

In some implementations, the example frequency reference system 900 includes a second laser system 922 configured to generate a second input optical signal. The interferometer 904 is configured to receive the second input optical signal and generate a second output optical signal in response. The example frequency reference system 900 also includes a second detector 924 configured to receive the second output optical signal and generate a second detector signal in response. The second detector signal represents frequency properties of the second output optical signal. One or both of the second laser system 922 and the detector 924 may be optically coupled to the interferometer 904 through a second fiber circulator 926. The optical coupling may be analogous to that between the laser system 902, the detector 912, and the fiber circulator 914.

In these implementations, the control system is in communication with the second laser system 922 and the second detector 924. Moreover, the operations of the control system further include receiving the second detector signal from the second detector 924 and determining a second difference in frequency between a frequency of the second input optical signal and the resonance frequency of the etalon based on the second detector signal. The operations also include sending a second frequency-control signal to the second laser system 922 representing a change in frequency of the second input optical signal based on the second difference.

In some implementations, such as shown in FIG. 9, the laser system 902 and the detector 912 are optically coupled to the interferometer 904 through the first optical port 908. Moreover, the second laser system 922 and the second detector 924 are optically coupled to the interferometer 904 through the second optical port 910. In other implementations, the laser system 902, the detector 912, the second laser system 922, and the second detector 924 are optically coupled to the interferometer 904 through the same port. In still other implementations, the laser system 900 and the second detector 924 are optically coupled to the interferometer 904 through the first optical port 908 and the second laser system 922 and the detector 924 are optically coupled to the interferometer 904 through the second optical port 910.

In some implementations, the example frequency reference system 900 includes thermal insulation 926 surrounding the housing 906 of the interferometer 904. The example frequency reference system 900 also includes a heater 928 disposed between the thermal insulation 926 and the housing 906. A sensor is thermally coupled to the housing 906 and configured to generate a sensor signal representing a temperature of the housing 906. The example frequency reference system 900 additionally includes a temperature control system in communication with the sensor and the heater 908. The temperature control system may be part of the control system. The temperature control system is configured to perform operations that include receiving the sensor signal from the sensor and determining a difference between the temperature of the housing 906 and a target temperature based on the sensor signal. The operations also include sending a first temperature-control signal to the heater 928 to alter an amount of heat generated by the heater 928 based on the difference. In further implementations, the example frequency reference system 900 includes a cooler disposed between the thermal insulation 926 and the housing 906. In these implementations, the temperature control system is in communication with the cooler and the operations performed by the temperature control system include sending a second temperature-control signal to the cooler to alter an amount of heat removed from the housing 906 based on the difference.

In some implementations, the temperature of the housing 906 is monitored, but not actively controlled. In these implementations, temperature data from a sensor can be used to estimate shifts in a resonant frequency of the etalon. The estimated shifts are fed forward into the control system, allowing the control system to compensate for temperature changes in real time. The feed forward process may allow the example frequency reference system 900 to maintain a higher level of frequency stability compared to a system with no feed forward. Moreover, active temperature stabilization of the housing is not needed, greatly reducing an electrical power consumption of the example frequency reference system 900.

For example, the example frequency reference system 900 may include a sensor thermally coupled to the housing 906 and configured to generate a sensor signal representing a temperature of the housing 906. The sensor is in communication with the control system. The control system is further configured to perform operations that include receiving the sensor signal from the sensor and estimating a change in temperature of the etalon based on a heat transfer model of the interferometer and the sensor signal. The operations also include determining a shift in the resonance frequency of the etalon based on a thermal expansion model of the etalon and the estimated change in temperature. The change in frequency of the input optical signal—which is represented by the frequency-control signal sent to the laser system 902—is further based on the shift in the resonance frequency of the etalon. In this example, the etalon of the interferometer 904 may include first and second reflective surfaces disposed along the optical path. The etalon may also include a spacer separating the reflective surfaces from each other and configured to set an optical length therebetween, the optical length part of the optical path. As such, determining the shift in the resonance frequency of the etalon may include determining a change in the optical length based on the thermal expansion model and the estimated change in temperature.

The heat transfer model may be generated by the control system to estimate the temperature of the etalon, rather than the housing 906, which can be measured directly (e.g., by the sensor). The heat transfer model may depend on a variety of inputs, including current and past temperatures of the housing 906 and the current resonance frequency of the etalon. The heat transfer model is operable to estimate changes to the temperature of the etalon based on changes in the model inputs. Physical parameters of the example frequency reference system 900, such as the heat capacity of the etalon and thermal coupling from radiation, conduction, and convection, can be used to generate the heat transfer model. For example, the control system can iteratively predict the heat transfer (Q) between the etalon and the housing 906 based on the difference between a measured temperature of the housing 906 and the current, estimated temperature of the etalon. In many cases, heat transfer will be dominated by radiation and the contribution of conductive and convective heat transfer negligible. In these cases, the heat transfer may be calculated using the Stefan-Boltzmann law, which may be represented by Equation 4.

$$Q = A\sigma\varepsilon(T_{housing}^4 - T_{etalon}^4) \quad \text{Eq. (4)}$$

Here, A is the surface area of the etalon, $\sigma$ is the Boltzmann constant, $\varepsilon$ is the emissivity of the etalon, $T_{housing}$ is the temperature of the housing 906, and $T_{etalon}$ is the temperature of the etalon. The heat capacity of the etalon can then be used to calculate the new estimated temperature of the etalon. However, other heat transfer models can be used, including ones that assume a linear dependence on the temperature difference.

The thermal expansion model may then be used to calculate the change in the optical length of the etalon based on the changes in temperature estimated for the etalon using the heat transfer model. The resonance frequency of the etalon depends on its optical length, and as such, the shift in the resonance frequency may be subsequently calculated using the change in optical length. The control system can then compensate for the shift in resonance frequency by modifying the frequency-control signal sent to the laser system 902. In some instances, the control system uses an offset locking scheme to adjust the frequency of the sidebands ($f_{mod}$) can be adjusted to compensate for the drift in the etalon. This adjustment may allow the control system to keep the carrier frequency of the laser system 902 stable. The offset locking scheme is described further in relation to FIG. 11. In some instances, the example frequency reference system 900 includes an absolute frequency reference, such as a wavemeter or atomic reference. The control system may then periodically compare the output of the laser system 902 to the absolute frequency reference. These comparisons can help correct any offsets or long-term drift in the model.

Figure 10A:
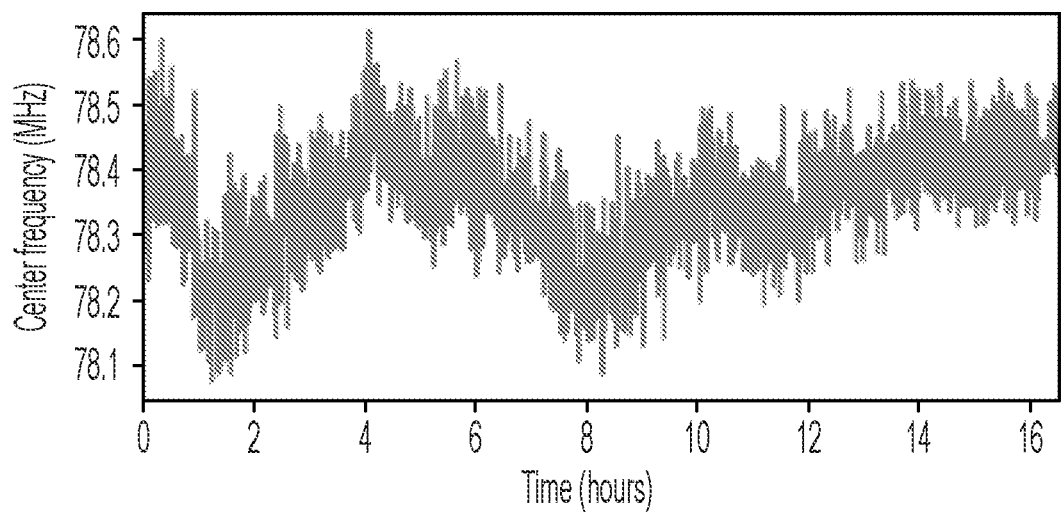
FIG. 10A is a graph of a center frequency of light emitted by a laser system in response to feed forward operations executed by a control system of an example frequency reference system.
Figure 10B:
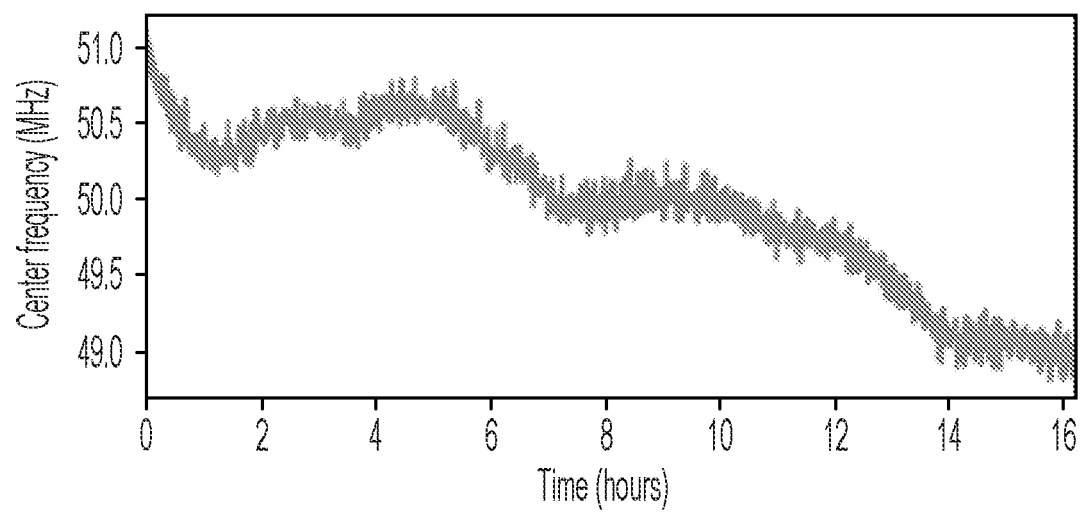
FIG. 10B is a graph of the center frequency of light of FIG. 10A when the feed forward operations are not executed.

Now referring to FIG. 10A, a graph is presented of a center frequency of light emitted by the laser system 902 in response to feed forward operations executed by the control system, according to an illustrative example. The frequency variation is about 0.5 MHz in the measurement time period shown by the graph, which is about 16 hours. Concomitantly, the drift in temperature of the housing 906 is approximately 300 mK. By comparison, FIG. 10B presents a graph of the center frequency of light when the feed forward operations are not executed. In FIG. 10B, the frequency variation is notably larger, about 2 MHz, in the same measurement time period. The concomitant drift in temperature of the housing 906 is approximately 150 mK. As evidenced by comparing FIGS. 10A and 10B, the drift in center frequency is significantly smaller in when feed forward operations are executed by the control system than when they are not, even though the temperature of the housing 906 changed by a greater amount over the measurement time period. Moreover, in comparing the two cases, it is evident that even with higher variations in temperature, the example frequency reference system 900 with feed forward active offers better frequency stability than the system 900 with no active feed forward.

During operation, the input optical signal from the laser system 902 traverses the fiber circulator 914 to enter the interferometer 904. The fiber circulator 914 may be a three-port all-fiber optic device where light that enters one of the ports exits from the next in a cyclic manner. The input optical signal may be coupled into the first circular port 916 of the fiber circulator 914 and then be directed to the housing 906 from the second circulator port 918. Inside the housing 906, the input optical signal is injected into the interferometer 904. The light reflected off the reflective surfaces of the etalon travels back to the fiber circulator 914 into second circulator port 918 and is then directed out the third circulator port 920. The third circulator port 920 is optically coupled to the detector 912, which may be a photodetector. Based on the detector signal, feedback from the control system is provided to the laser system 902 to drive it towards a set frequency. The nature of the feedback depends on the type of locking scheme used, and some signal processing may be required in some cases.

In some variations, the heater 928, which could be a resistive heater, and the cooler, which could be a thermo-electric cooling element, provide active temperature stabilization of the housing 906. For thermal and vibration insulation, the housing 906, the heater 928, and the cooler may be packed inside a box defined by the thermal insulation 926. The thermal insulation 926 may be a foam material. However, similar materials may be used that can act as thermal insulation while absorbing shocks.

In FIG. 9, two different laser systems 902, 922 are optically coupled to the interferometer 904. The detection of frequencies from both laser systems 902, 922 may be performed in reflection mode or transmission mode of the etalon. In many variations, detection is performed in reflection mode. The limit on the number of lasers is determined by the coatings on the interferometer 904, e.g., the mirror reflectivities at specific wavelengths of light, the optical bandwidths of the fiber devices, and the ability to separate the different lasers for independent detection. In some variations, a single laser system is used. In other variations, three or more laser systems may be used. The signals from different laser systems can be separated using properties like modulation frequencies, polarizations, or wavelengths. The detection of the laser systems can also be performed in transmission through the etalon, rather than in reflection, but this may reduce a bandwidth of the feedback signal to the laser system.

In addition to frequency stabilization, the example frequency reference system 900 may be used as a precise optical filter. Transmission through the etalon can produce a stable, narrowband source of light. In this case, the example frequency reference system 900 operates as a filter. However, when using the example frequency reference system 900 as a precise optical filter, an intensity of the output optical signal may be notably reduced. Nonetheless, such reduction may be acceptable in certain application where portability of the example frequency reference system 900 is needed.

Figure 11:
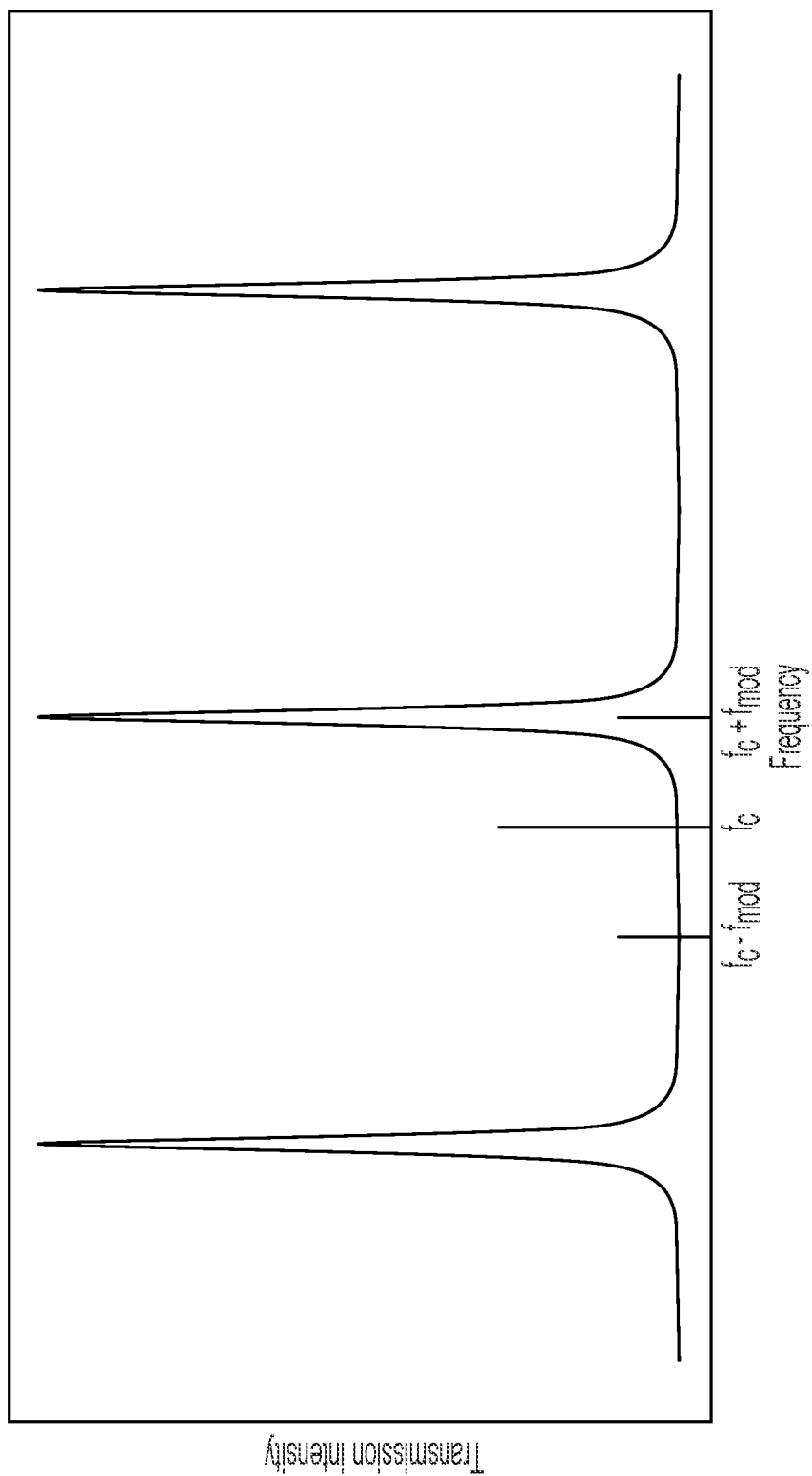
FIG. 11 is a graph representing off-set locking based on a Fabry-Pérot etalon.

Now referring to FIG. 11, a graph is presented representing off-set locking based on a Fabry-Pérot etalon (or interferometer). In FIG. 11, the highest intensity line (labeled $f_{mod}$) is a carrier frequency of the laser and the two lower intensity lines (labeled $f_c-f_{mod}$ and $f_c+f_{mod}$) are frequency sidebands generated by phase or frequency modulation. The Gaussian curves are different resonances of the Fabry-Pérot etalon. In this graph, the upper frequency sideband is locked to a cavity resonance.

There are a variety of applications that utilize lasers with a high degree of frequency stability. For many of these applications, the laser needs to be stabilized to a specific frequency. Often the desired frequency is known in absolute terms, for example, the frequency of a known atomic transition. In some cases, the desired laser frequency cannot be referenced directly to a fixed frequency reference like an atomic or molecular transition. For example, a system might require a specific frequency offset from a second laser or a known atomic or molecular transition. If the desired frequency is close to, but not at an absolute frequency reference, it can be useful to apply an offset locking scheme. In offset locking, an electro-optic modulator (EOM) may be used to create a sideband on the fundamental laser frequency that is positioned at a precise frequency determined by the radio frequency drive of the EOM. By changing the EOM drive frequency, the fundamental laser frequency can be changed (or tuned) relative to an absolute frequency reference.

Fabry-Pérot etalons have periodic resonances spaced out in frequency by one (1) free spectral range (FSR) and lasers can be locked to any of these resonances. In many applications, it is desirable to construct the etalon so that these resonances are fixed and do not shift. Using offset locking, lasers can be stabilized to arbitrary frequencies between resonance peaks. EOMs can be used to generate frequency sidebands that are offset by a fixed amount, $f_{mod}$, from the fundamental laser frequency at carrier frequency $f_c$, as shown in FIG. 11. One of the frequency sidebands ($f_c \pm f_{mod}$), rather than the fundamental frequency, can be locked to a cavity resonance. Since the frequency of the cavity resonance is very stable and the sideband is kept locked to the cavity resonance, changing the modulation frequency effectively tunes the carrier frequency of the laser.

Figure 12:
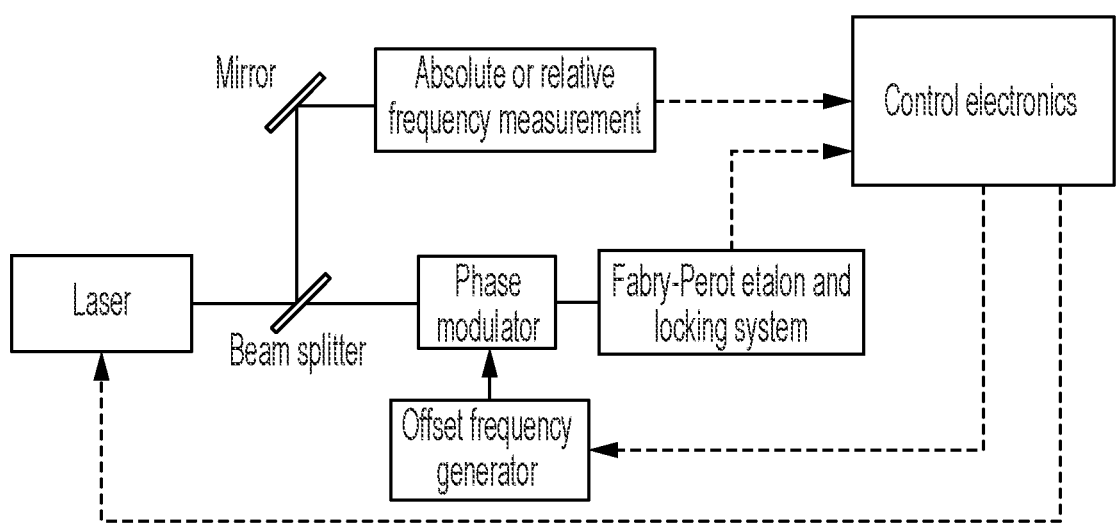
FIG. 12 is a schematic diagram is presented of an example frequency reference system that includes an etalon and a frequency measurement subsystem to stabilize a frequency output of a laser.

Offset locking to a Fabry-Pérot etalon can be combined with an additional absolute or relative frequency measurement to stabilize a laser to a chosen frequency. FIG. 12 presents a schematic diagram of an example frequency reference system that includes Fabry-Pérot etalon and a frequency measurement subsystem to stabilize a frequency output of a laser. The etalon may be analogous to the etalon 514 described in relation to the example device 500 of FIG. 5. The output of the laser is split into multiple paths; one of the paths passes through an EOM to generate sidebands, and then the beam is directed to a Fabry-Pérot etalon. One of the frequency sidebands is locked to the etalon, stabilizing the laser frequency. Another beam path is directed towards either an absolute or a relative frequency measurement. Typically, this beam path does not pass through the EOM, so only the fundamental frequency is present. Examples of absolute frequency measurements include wavemeters or atomic transitions. An example of a relative frequency measurement would be a beat note measurement between two separate lasers, which measures the frequency difference between the two lasers. The result of the absolute or relative frequency measurement can be used to set the modulation frequency sent to the phase modulator, tuning the fundamental frequency to the desired value.

In some cases, the absolute or relative frequency measurement alone is sufficient to frequency stabilize a laser and a Fabry-Pérot etalon is not needed. However, in many cases a Fabry-Pérot cavity is necessary or advantageous compared to other options. Some absolute frequency references, such as wavemeters, provide relatively slow feedback on the sub-kHz order. Fabry-Pérot etalons, particularly when used in reflection mode, can allow for feedback on the order of several MHz or more, permitting much better frequency stabilization. Other absolute frequency references, such as atomic transitions, may be useful only at specific, discrete frequencies. Due to their periodic resonances, Fabry-Pérot etalons can be used over a very broad range of frequencies. Additionally, Fabry-Pérot etalons can be designed to have a specific resonance bandwidth, helping a user to achieve the frequency stabilization level appropriate for their system.

In some aspects of what is described, a device for providing a reference frequency of light may be described by the following examples:

Example 1. A device for providing a reference frequency of light, the device comprising:
 a housing having first and second openings and formed of
  a ceramic material;

a first optical window covering the first opening and coupled to the housing by a first ceramic bond that forms a hermetic seal around the first opening;

a second optical window covering the second opening and coupled to the housing by a second ceramic bond that forms a hermetic seal around the second opening;

an etalon disposed within an evacuated volume enclosed by the housing, the first optical window, and the second optical window; and one or more supports suspending the etalon in the evacuated volume, the one or more supports formed of a material having a thermal conductivity no greater than 5 W/m·K at room temperature.

Example 2. The device of example 1, wherein the ceramic material is a glass material.

Example 3. The device of example 1 or example 2, wherein the ceramic material has a thermal conductivity no greater than 5 W/m·K at room temperature.

Example 4. The device of example 1 or any one of examples 2-3, wherein the material forming the one or more supports is a ceramic material.

Example 5. The device of example 1 or any one of examples 2-4, wherein the etalon comprises:

two reflective surfaces on an optical path through the evacuated volume from the first optical window to the second optical window; and a spacer separating the reflective surfaces from each other and configured to set an optical length therebetween, the optical length being part of the optical path.

Example 6. The device of example 5, wherein the spacer is formed of a material having a thermal expansion coefficient less than $10^{-5}$ per Kelvin at room temperature.

Example 7. The device of example 5 or example 6, wherein the spacer is formed of a material having a zero-crossing temperature of the coefficient of thermal expansion.

Example 8. The device of example 1 or any one of examples 2-7, wherein the evacuated volume has a vacuum pressure no greater than $10^{-3}$ Torr.

Example 9. The device of example 1 or any one of examples 2-8, wherein the housing comprises:

a cylindrical tube having first and second open ends;

a first plate covering the first open end and coupled to the cylindrical tube through a third ceramic bond that forms a hermetic seal around the first open end, the first plate comprising a first hole that serves as the first opening of the housing; and a second plate covering the second open end and coupled to the cylindrical tube through a fourth ceramic bond that forms a hermetic seal around the second open end, the second plate comprising a second hole that serves as the second opening of the housing.

Example 10. The device of example 9, wherein the cylindrical tube is formed of glass.

Example 11. The device of example 9 or example 10, wherein the first and second plates are formed of silicon.

Example 12. The device of example 1 or any one of examples 2-11, comprising an optical assembly that includes:

an alignment plate having a planar surface with first and second grooves therein, the first and second grooves oriented perpendicular to each other and having an intersection adjacent a hole in the second groove, the hole extending through the alignment plate;

a collimator disposed in the first groove and comprising an optical fiber and a lens, the lens configured to focus light along the first groove;

a first rod disposed in the first groove and having an end defined by a first reflective face, the first reflective face oriented to receive light from the lens and redirect the light along the second groove; and a second rod disposed in the second groove and having an end defined by a second reflective face, the second reflective face oriented to receive light from the first reflective face and redirect the light through the hole.

Example 13. The device of example 12, wherein the etalon comprises first and second reflective surfaces on the optical path;

wherein one or both of the first and second reflective surfaces have an instance of the optical assembly coupled thereto, each instance of the optical assembly residing within the evacuated volume; and wherein an optical window adjacent an instance of the optical assembly comprises:

a first window surface opposite a second window surface, the first window surface exposed to the evacuated volume, the second window surface exposed to an exterior of the housing, a first collimation package in the evacuated volume that optically couples the first window surface to the optical fiber of the instance, the first collimation package comprising a first lens, and a second collimation package exterior to the housing and optically coupled to the second window surface, the second collimation package comprising a second lens and a second optical fiber.

Example 14. The device of example 12 or example 13, wherein one or both of the first opening and the second opening of the housing have an instance of the optical assembly associated therewith, each instance of the optical assembly residing exterior to the housing; and wherein the hole of each instance of the optical assembly is aligned with the associated opening to allow the optical assembly to optically couple to the optical path.

Example 15. The device of example 1 or any one of examples 2-14, wherein the etalon is a Fabry-Pérot interferometer.

Example 16. The device of example 1 or any one of examples 2-15, comprising a radiation shield disposed in the evacuated volume between an inner surface of the housing and the etalon.

In some aspects of what is described, a frequency reference system may be described by the following examples:

Example 17. A frequency reference system comprising:

a laser system configured to generate an input optical signal;

an interferometer configured to receive the input optical signal and generate an output optical signal in response, the interferometer comprising:

a housing having first and second optical ports and formed of ceramic material, the housing enclosing an evacuated volume, an etalon disposed along an optical path through the evacuated volume from the first optical port to the second optical port, and one or more supports suspending the etalon in the evacuated volume, the one or more supports formed of a material having a thermal conductivity no greater than 5 W/m·K at room temperature;

a detector configured to receive the output optical signal and generate a detector signal in response, the detector signal representing frequency properties of the output optical signal; and a control system in communication with the laser system and the detector, the control system configured to perform operations comprising:
  receiving the detector signal from the detector,
  determining a difference in frequency between a frequency of the input optical signal and a resonance frequency of the etalon based on the detector signal, and
  sending a frequency-control signal to the laser system representing a change in frequency of the input optical signal based on the difference.

Example 18. The frequency reference system of example 17, wherein the ceramic material has a thermal conductivity no greater than 5 W/m·K at room temperature.

Example 19. The frequency reference system of example 17 or example 18, wherein the material forming the one or more supports is a ceramic material.

Example 20. The frequency reference system of example 17 or any one of examples 18-19, wherein the etalon comprises:
  first and second reflective surfaces disposed along the optical path; and
  a spacer separating the reflective surfaces from each other and configured to set an optical length therebetween, the optical length being part of the optical path.

Example 21. The frequency reference system of example 20, wherein the spacer is formed of a material having a thermal expansion coefficient less than $10^{-5}$ per Kelvin at room temperature.

Example 22. The frequency reference system of example 17 or any one of examples 18-21, wherein the interferometer is a Fabry-Pérot interferometer.

Example 23. The frequency reference system of example 17 or any one of examples 18-22, wherein the laser system and the detector are optically coupled to the interferometer through the same optical port.

Example 24. The frequency reference system of example 17 or any one of examples 18-22, wherein the laser system and the detector are optically coupled to the interferometer through distinct optical ports.

Example 25. The frequency reference system of example 17 or any one of examples 18-24, wherein one or both of the laser system and the detector are optically coupled to the interferometer through a fiber circulator, the fiber circulator comprising:
  a first circulator port optically coupled to the laser system,
  a second circulator port optically coupled to the first or second optical port of the interferometer; and
  a third circulator port optically coupled to the detector.

Example 26. The frequency reference system of example 17 or any one of examples 18-25, wherein the frequency reference system comprises:
  a second laser system configured to generate a second input optical signal, the interferometer configured to receive the second input optical signal and generate a second output optical signal in response;
  a second detector configured to receive the second output optical signal and generate a second detector signal in response, the second detector signal representing frequency properties of the second output optical signal; and
  wherein the control system is in communication with the second laser system and the second detector, the operations performed by the control system comprising:
    receiving the second detector signal from the second detector,
    determining a second difference in frequency between a frequency of the second input optical signal and the resonance frequency of the etalon based on the second detector signal, and
    sending a second frequency-control signal to the second laser system representing a change in frequency of the second input optical signal based on the second difference.

Example 27. The frequency reference system of example 26 (and excluding the subject matter of example 24),
  wherein the laser system and the detector are optically coupled to the interferometer through the first optical port; and
  wherein the second laser system and the second detector are optically coupled to the interferometer through the second optical port.

Example 28. The frequency reference system of example 26 (and excluding the subject matter of example 24), wherein the laser system, the detector, the second laser system, and the second detector are optically coupled to the interferometer through the same port.

Example 29. The frequency reference system of example 26 (and excluding the subject matter of example 23),
  wherein the laser system and the second detector are optically coupled to the interferometer through the first optical port; and
  wherein the second laser system and the detector are optically coupled to the interferometer through the second optical port.

Example 30. The frequency reference system of claim 26 or any one of examples 27-29, wherein one or both of the second laser system and the second detector are optically coupled to the interferometer through a fiber circulator, the fiber circulator comprising:
  a first circulator port optically coupled to the second laser system,
  a second circulator port optically coupled to the first or second optical port of the interferometer; and
  a third circulator port optically coupled to the second detector.

Example 31. The frequency reference system of example 17 or any one of examples 18-30, comprising:
  thermal insulation surrounding the housing of the interferometer;
  a heater disposed between the thermal insulation and the housing;
  a sensor thermally coupled to the housing and configured to generate a sensor signal representing a temperature of the housing; and
  a temperature control system in communication with the sensor and the heater, the temperature control system configured to perform operations comprising:
    receiving the sensor signal from the sensor,
    determining a difference between the temperature of the housing and a target temperature based on the sensor signal, and
    sending a first temperature-control signal to the heater to alter an amount of heat generated by the heater based on the difference.

Example 32. The frequency reference system of example 31, comprising:
  a cooler disposed between the thermal insulation and the housing;
  wherein the temperature control system is in communication with the cooler and the operations performed by the temperature control system comprise:
    sending a second temperature-control signal to the cooler to alter an amount of heat removed from the housing based on the difference.

Example 33. The frequency reference system of example 17 or any one of examples 18-30, comprising:
  a sensor thermally coupled to the housing and configured to generate a sensor signal representing a temperature of the housing, the sensor in communication with the control system;
  wherein the control system is further configured to perform operations comprising:
    receiving the sensor signal from the sensor,
    estimating a change in temperature of the etalon based on a heat transfer model of the interferometer and the sensor signal, and
    determining a shift in the resonance frequency of the etalon based on a thermal expansion model of the etalon and the estimated change in temperature; and
  wherein the change in frequency of the input optical signal is further based on the shift in the resonance frequency of the etalon.

Example 34. The frequency reference system of example 33 (and excluding the subject matter of example 20),
  wherein the etalon comprises:
    first and second reflective surfaces disposed along the optical path, and
    a spacer separating the reflective surfaces from each other and configured to set an optical length therebetween, the optical length part of the optical path; and
  wherein determining a shift in the resonance frequency comprises determining a change in the optical length based on the thermal expansion model and the estimated change in temperature.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A device for providing a reference frequency of light, the device comprising:
  a housing having first and second openings and formed of a ceramic material;
  a first optical window covering the first opening and coupled to the housing by a first ceramic bond that forms a hermetic seal around the first opening;
  a second optical window covering the second opening and coupled to the housing by a second ceramic bond that forms a hermetic seal around the second opening;
  an etalon disposed within an evacuated volume enclosed by the housing, the first optical window, and the second optical window; and
  one or more supports suspending the etalon in the evacuated volume, the one or more supports formed of a material having a thermal conductivity no greater than 5 W/m·K at room temperature.

2. The device of claim 1, wherein the ceramic material is a glass material.

3. The device of claim 1, wherein the ceramic material has a thermal conductivity no greater than 5 W/m·K at room temperature.

4. The device of claim 1, wherein the material forming the one or more supports is a ceramic material.

5. The device of claim 1, wherein the etalon comprises:
  two reflective surfaces on an optical path through the evacuated volume from the first optical window to the second optical window; and
  a spacer separating the reflective surfaces from each other and configured to set an optical length therebetween, the optical length being part of the optical path.

6. The device of claim 5, wherein the spacer is formed of a material having a thermal expansion coefficient less than $10^{-5}$ per Kelvin at room temperature.

7. The device of claim 5, wherein the spacer is formed of a material having a zero-crossing temperature of the coefficient of thermal expansion.

8. The device of claim 1, wherein the evacuated volume has a vacuum pressure no greater than $10^{-3}$ Torr.

9. The device of claim 1, wherein the housing comprises:
  a cylindrical tube having first and second open ends;
  a first plate covering the first open end and coupled to the cylindrical tube through a third ceramic bond that forms a hermetic seal around the first open end, the first plate comprising a first hole that serves as the first opening of the housing; and
  a second plate covering the second open end and coupled to the cylindrical tube through a fourth ceramic bond that forms a hermetic seal around the second open end, the second plate comprising a second hole that serves as the second opening of the housing.

10. The device of claim 9, wherein the cylindrical tube is formed of glass.

11. The device of claim 9, wherein the first and second plates are formed of silicon.

12. The device of claim 1, comprising an optical assembly that includes:
  an alignment plate having a planar surface with first and second grooves therein, the first and second grooves oriented perpendicular to each other and having an intersection adjacent a hole in the second groove, the hole extending through the alignment plate;
  a collimator disposed in the first groove and comprising an optical fiber and a lens, the lens configured to focus light along the first groove;
  a first rod disposed in the first groove and having an end defined by a first reflective face, the first reflective face oriented to receive light from the lens and redirect the light along the second groove; and
  a second rod disposed in the second groove and having an end defined by a second reflective face, the second reflective face oriented to receive light from the first reflective face and redirect the light through the hole.

13. The device of claim 12,
wherein the etalon comprises first and second reflective surfaces on the optical path;
wherein one or both of the first and second reflective surfaces have an instance of the optical assembly coupled thereto, each instance of the optical assembly residing within the evacuated volume; and
wherein an optical window adjacent an instance of the optical assembly comprises:
  a first window surface opposite a second window surface, the first window surface exposed to the evacuated volume, the second window surface exposed to an exterior of the housing,
  a first collimation package in the evacuated volume that optically couples the first window surface to the optical fiber of the instance, the first collimation package comprising a first lens, and
  a second collimation package exterior to the housing and optically coupled to the second window surface, the second collimation package comprising a second lens and a second optical fiber.

14. The device of claim 12,
wherein one or both of the first opening and the second opening of the housing have an instance of the optical assembly associated therewith, each instance of the optical assembly residing exterior to the housing; and
wherein the hole of each instance of the optical assembly is aligned with the associated opening to allow the optical assembly to optically couple to the optical path.

15. The device of claim 1, wherein the etalon is a Fabry-Pérot interferometer.

16. A frequency reference system comprising:
a laser system configured to generate an input optical signal;
an interferometer configured to receive the input optical signal and generate an output optical signal in response, the interferometer comprising:
  a housing having first and second optical ports and formed of ceramic material, the housing enclosing an evacuated volume,
  an etalon disposed along an optical path through the evacuated volume from the first optical port to the second optical port, and
  one or more supports suspending the etalon in the evacuated volume, the one or more supports formed of a material having a thermal conductivity no greater than 5 W/m·K at room temperature;
a detector configured to receive the output optical signal and generate a detector signal in response, the detector signal representing frequency properties of the output optical signal; and
a control system in communication with the laser system and the detector, the control system configured to perform operations comprising:
  receiving the detector signal from the detector,
  determining a difference in frequency between a frequency of the input optical signal and a resonance frequency of the etalon based on the detector signal, and
  sending a frequency-control signal to the laser system representing a change in frequency of the input optical signal based on the difference.

17. The frequency reference system of claim 16, wherein the ceramic material has a thermal conductivity no greater than 5 W/m·K at room temperature.

18. The frequency reference system of claim 16, wherein the material forming the one or more supports is a ceramic material.

19. The frequency reference system of claim 16, wherein the etalon comprises:
  first and second reflective surfaces disposed along the optical path; and
  a spacer separating the reflective surfaces from each other and configured to set an optical length therebetween, the optical length being part of the optical path.

20. The frequency reference system of claim 19, wherein the spacer is formed of a material having a thermal expansion coefficient less than $10^{-5}$ per Kelvin at room temperature.

21. The frequency reference system of claim 16, wherein the interferometer is a Fabry-Pérot interferometer.

22. The frequency reference system of claim 16, wherein the laser system and the detector are optically coupled to the interferometer through the same optical port.

23. The frequency reference system of claim 16, wherein the laser system and the detector are optically coupled to the interferometer through distinct optical ports.

24. The frequency reference system of claim 16, wherein one or both of the laser system and the detector are optically coupled to the interferometer through a fiber circulator, the fiber circulator comprising:
  a first circulator port optically coupled to the laser system,
  a second circulator port optically coupled to the first or second optical port of the interferometer; and
  a third circulator port optically coupled to the detector.

25. The frequency reference system of claim 16, wherein the frequency reference system comprises:
  a second laser system configured to generate a second input optical signal, the interferometer configured to receive the second input optical signal and generate a second output optical signal in response;
  a second detector configured to receive the second output optical signal and generate a second detector signal in response, the second detector signal representing frequency properties of the second output optical signal; and
  wherein the control system is in communication with the second laser system and the second detector, the operations performed by the control system comprising:
    receiving the second detector signal from the second detector,
    determining a second difference in frequency between a frequency of the second input optical signal and the resonance frequency of the etalon based on the second detector signal, and
    sending a second frequency-control signal to the second laser system representing a change in frequency of the second input optical signal based on the second difference.

26. The frequency reference system of claim 25,
wherein the laser system and the detector are optically coupled to the interferometer through the first optical port; and
wherein the second laser system and the second detector are optically coupled to the interferometer through the second optical port.

27. The frequency reference system of claim 25, wherein the laser system, the detector, the second laser system, and the second detector are optically coupled to the interferometer through the same port.

28. The frequency reference system of claim 25,
wherein the laser system and the second detector are optically coupled to the interferometer through the first optical port; and
wherein the second laser system and the detector are optically coupled to the interferometer through the second optical port.

29. The frequency reference system of claim 16, comprising:
thermal insulation surrounding the housing of the interferometer;
a heater disposed between the thermal insulation and the housing;
a sensor thermally coupled to the housing and configured to generate a sensor signal representing a temperature of the housing; and
a temperature control system in communication with the sensor and the heater, the temperature control system configured to perform operations comprising:
receiving the sensor signal from the sensor,
determining a difference between the temperature of the housing and a target temperature based on the sensor signal, and
sending a first temperature-control signal to the heater to alter an amount of heat generated by the heater based on the difference.

30. The frequency reference system of claim 29, comprising:
a cooler disposed between the thermal insulation and the housing;
wherein the temperature control system is in communication with the cooler and the operations performed by the temperature control system comprise:
sending a second temperature-control signal to the cooler to alter an amount of heat removed from the housing based on the difference.

* * * * *